United States Statutory Invention Registration [19]

[11] Reg. Number: H563

Kirkpatrick et al.

[43] Published: Jan. 3, 1989

[54] USE OF SULFUR-CONTAINING COMPOUNDS FOR CONTROLLING PLANT PARASITIC NEMATODES

[76] Inventors: Terrence L. Kirkpatrick, R.R. 2, Box 247A, Hope, Ark. 71801; Henry S. Yang, 1118 Queensferry Rd., Cary, N.C. 27511

[21] Appl. No.: 808,199

[22] Filed: Dec. 12, 1985

[51] Int. Cl.[4] ..... A01C 1/06; A01C 21/00

[52] U.S. Cl. ..... 47/57.6; 47/DIG. 9; 47/DIG. 11

[58] Field of Search ..... 47/DIG. 9, DIG. 11, 47/57.6

[56] References Cited

U.S. PATENT DOCUMENTS

| | | | |
|---|---|---|---|
| 4,008,328 | 2/1977 | Siegle et al. | 514/477 |
| 4,058,067 | 11/1977 | Wright et al. | 47/DIG. 11 |
| 4,072,751 | 2/1978 | Damasceno | 514/477 |
| 4,268,520 | 5/1981 | Grantham | 514/477 |
| 4,272,417 | 6/1981 | Barke et al. | 47/57.6 |
| 4,315,928 | 2/1982 | Thurman | 514/506 |
| 4,327,110 | 4/1982 | D'Silva | 514/430 |
| 4,341,795 | 7/1982 | Liang | 514/477 |
| 4,378,367 | 3/1983 | Brooker et al. | 47/57.6 |
| 4,382,957 | 5/1983 | D'Silva | 514/477 |
| 4,400,389 | 8/1983 | D'Silva | 514/430 |
| 4,413,007 | 11/1983 | D'Silva | 514/477 |
| 4,413,008 | 11/1983 | Drabek et al. | 514/477 |
| 4,454,682 | 6/1984 | Bollinger | 47/57.6 |
| 4,486,447 | 12/1984 | D'Silva | 514/470 |
| 4,551,472 | 11/1985 | D'Silva | 514/477 |

OTHER PUBLICATIONS

Organization of Tropical American Nematologists XVII Annual Meeting, Jul. 28–Aug. 2, 1985, Abstract, p. 23.

Truelove, B. et al., Journal of Nematology, vol. 9, No. 4, Oct. 1977, pp. 326–330.

Rodriguez-Kabana, R. et al., Proc. Am. Phytophathol. Soc. 3:297 (1976).

Rodriguez-Kabana, R. et al., Nematropica, vol. 8, No. 1, (1978) pp. 26–31.

Veech, J. A., J. Nematol. 9:184–185 (1977).

Rodriguez-Kabana, R. et al., Nematropica 6:81–85 (1976).

Varaprasad, K. S. et al., Indian Journal of Nematology 10:130–134 (1980).

Laughlin, C. W. et al., Revista de Agricultura 53:79–81 (1978).

Sivakumar, C. V. et al., Indian Journal of Nematology 6:106–108 (1978).

Walker, J. T. et al., J. Nematol. 13: 405–409 (1981).

Mathur, V. K. et al., Indian Journal of Nematology 9:86 (1979).

Singh, I. et al., Indian Journal of Nematology 8:89–91 (1978).

Sivakumar, C. V. et al., Madras Agric. Journal 60(7):530–535, Jul. 1973.

Townshend, J. L. et al., Canadian Journal of Plant Science 59:519–520 (1979).

Dolmans, N. G. M. et al., Med. Fac. Landbouww, Rijksuniv. Gent, 45:733–737 (1980).

Tayar, A., Procd. of the Sec. Research Plan. Conf. on Root-Knot Nema., Region VII, Athens, Greece, 1979.

Kaushik, H. D. et al., Haryana Agric. Univ. Jour. of Research 11:106–108 (1981).

Ribeiro, A. S. Anais VII Veuniao da Cultura do Arroz, pp. 207–211 (1978).

Singh, S. P et al., Nematologia Mediterrania 8: 193–198 (1980).

Brown, R. H. Australian Journal of Experimental Agric. and Animal Husb. 13:587–592 (1973).

Silveira, S. G. P. da, Biologico 44:169–176 (1978).

Uebayashi, Y. et al., Bull. of the Aichi-Ken Agric. Exp. Station No. 25 (1971).

Bonnemaison, L., Inter. Plant Prot. Congress (8th), Moscow Aug. 21–26, 1975.

Nuhal, S. N et al., Rajasthan Agric. 12:103–108 (1975).

Ishiy, T., Rev. Agric. (Piracicaba, Braz.)50: 141–145 (1975).

Templeton, G. E. et al., Phytopathology 61:1522–1523 (1971).

Sosa Moss, C. et al., Nematropica 3:12–13 (1973).

Krishna Prasad, K. S. et al., Inter. Rice Research Newsletter, 2:19 (1977).

Krishna Prasad, K. S. et al., Jour. of Plant Diseases and Protection, 83(11) pp. 665–668 (1976).

Gerard, B. M., Pesticide Science 9:465–477 (1978).

Orr, C. C. et al., Plant Dis. Rep. 57:129–130 (1973).

Zeck, W. M., Pflauzenschutz Nachrichten Bayer 24:114–140 (1971).

Panda, M. et al., Indian Journal of Nematology 9:84–85 (1979).

Baicu, T. et al., Productia Vegetalia-Cereale si Plante Tehnice 32: 37–43 (1980).

*Primary Examiner*—John F. Terapane
*Assistant Examiner*—Susan Wolffe

[57] ABSTRACT

This invention relates to the use of sulfur-containing compounds for the control of plant parasitic nematodes by application of the compounds directly to seeds, seed pieces or root systems.

35 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

USE OF SULFUR-CONTAINING COMPOUNDS FOR CONTROLLING PLANT PARASITIC NEMATODES

BRIEF SUMMARY OF THE INVENTION

Technical Field

This invention relates to the use of sulfurcontaining compounds for the control of plant parasitic nematodes by application of the compounds directly to seeds, seed pieces or roots.

BACKGROUND OF THE INVENTION

Plant parasitic nematode control is generally achieved by application of nematicidally active compounds to soil prior to planting a crop. The compounds generally must be incorporated or injected into the soil prior to planting the crop, and this may result in certain crop phytotoxicity or lack of desired nematode control due to adverse environmental factors. A significant portion of crop damage due to parasitism by nematodes occurs during the initial 4–6 week development period.

Seed treatments and root dip treatments with known compounds have been evaluated during recent years for nematode control. See, for example. Truelove, B. et al., *J, Nematol* 9:326–330 (1977) and Rodriguez-Kabana. R. et al., *Nematropica* 8:26–31 (1978). Various known compounds which have been evaluated as either seed, seed piece or root dip treatment nematicides include, for example, carbofuran, oxamyl, aldicarb, aldicarb sulfone, dimethoate, bendiocarb, thiabendazole, diflubenzuron, phenamiphos, ficam, diazinon, sumithion, thiadiazinthion, thionazin and methomyl.

The application of nematicidal compounds directly as a seed, seed piece or bare root dip treatment for early season crop protection has several distinct advantages both from an economic and environmental standpoint. By treating seeds, seed pieces or bare roots prior to planting, the nematicide is concentrated at the site of nematode attack and, therefore, much less active ingredient on a per acre basis is required in comparison with conventional soil application. This not only makes nematode control more economic, but also minimizes environmental disturbance and any adverse nontarget effects.

Accordingly, the object of this invention is to provide a method for the use of certain sulfur-containing compounds to control plant parasitic nematodes by application of said compounds directly to seeds, seed pieces or bare root systems. This and other objects will readily become apparent to those skilled in the art in light of the teachings herein set forth.

DISCLOSURE OF THE INVENTION

This invention relates to a method for protecting plants from plant parasitic nematodes which comprises applying to the locus of nematode infestation a plant protectant amount of a compound having the formula:

$$R_1-X_1-(S)_a-\overset{\overset{\displaystyle O}{\|}}{(S)_b}-X_2-R_2$$

wherein $R_1$, $R_2$, $X_1$, $X_2$, a and b are as defined hereinafter.

DETAILED DESCRIPTION

As indicated above this invention relates to a method of protecting plants from plant parasitic nematodes by the application of certain sulfur-containing compounds to seeds, seed pieces or root systems of the plants. More particularly, this invention involves a method for protecting plants from plant parasitic nematodes comprising applying to the locus of nematode infestation a plant protectant amount of a compound having the formula:

$$R_1-X_1-(S)_a-\overset{\overset{\displaystyle O}{\|}}{(S)_b}-X_2-R_2$$

wherein:

$R_1$ and $R_2$ are independently a substituted or unsubstituted carbocyclic or heterocyclic ring system selected from a monocyclic aromatic or nonaromatic ring system, a bicyclic aromatic or nonaromatic ring system, and a bridged ring system which may be saturated or unsaturated in which the permissible substituents (Z) are the same or different and are one or more hydrogen, halogen, alkylcarbonyl, alkylcarbonylalkyl, alkoxycarbonylalkyl, alkoxycarbonylalkylthio, polyhaloalkenylthio, thiocyano, propargylthio, hydroxyimino, alkoxyimino, trialkylsilyloxy, aryldialkylsilyloxy, triarylsilyloxy. foramidino, alkylsulfamido, dialkylsulfamido, alkoxysulfonyl, polyhaloalkoxysulfonyl, hydroxy amino, aminocarbonyl, alkylaminocarbonyl, dialkylaminocarbonyl, aminothiocarbonyl, alkylaminothiocarbonyl, dialkylaminothiocarbonyl, nitro, cyano, hydroxycarbonyl and derivative salts, formamido, alkyl, alkoxy, polyhaloalkyl, polyhaloalkoxy, alkoxycarbonYl, substituted amino in which the permissible substituents are the same or different and are one or two propargyl, alkoxyalkyl, alkylthioalkyl, alkyl, alkenyl, haloalkenyl or polyhaloalkenyl; alkylthio, polyhaloalkylthio, alkylsulfinyl, polyhaloalkylsulfinyl, alkylsulfonyl, polyhaloalkylsulfonyl, alkylsulfonylamino, alkylcarbonylamino, polyhaloalkylsulfonylamino, polyhaloalkylcarbonylamino, trialkylsilyl, aryldialkylsilyl, triarylsilyl, sulfonic acid and derivative salts, phosphonic acid and derivative salts, alkoxycarbonylamino, alkylaminocarbonyloxy. dialkylaminocarbonyloxy, alkenyl, polyhaloalkenyl, alkenyloxy, alkynyl, alkynyloxy, polyhaloalkenyloxy, polyhaloalkynyl, polyhaloalkynyloxy, polyfluoroalkanol, cyanoalkylamino, semicarbazonomethyl, alkoxycarbonylhydrazonomethyl, alkoxyiminomethyl, unsubstituted or substituted aryloxyiminomethyl, hydrazonomethyl, unsubstituted or substituted arylhydrazonomethyl, a hydroxy group condensed with a mono-, di- or polysaccharide.

$$-X_3,\ =X_3,\ -X_3=R_3,\ =X_3-R_3,\ -X_3-R_3,\ -\overset{\overset{\displaystyle Y_1}{\|}}{P}\begin{matrix}-Y_2R_4\\ \diagdown Y_3R_5\end{matrix},$$

$$-Y_4-\overset{\overset{\displaystyle Y_1}{\|}}{P}\begin{matrix}-Y_2R_4\\ \diagdown Y_3R_5\end{matrix}\ \text{or}\ -\begin{matrix}\diagup Y_2R_4\\ \diagdown Y_3R_5\end{matrix}\ ;\ \text{or}$$

$R_1$ and $R_2$ are independently a substituted heteroatom or substituted carbon atom, or a substituted or unsubstituted, branched or straight chain containing two or more carbon atoms or heteroatoms in any combination in which the permissible substituents (Z) are the same or different and are one or more hydrogen, halogen, alkylcarbonyl, alkylcarbonylalkyl, alkoxycarbonylalkyl, alkoxycarbonylalkylthio, polyhaloalkenylthio, thiocyano, propargylthio, hydroxyimino, alkoxyimino, trialkylsilyloxy, aryldialkylsilyloxy, triarylsilyloxy, foramidino, alkylsulfamido, dialkylsulfamido, alkoxysulfonyl, polyhaloalkoxysulfonyl, hydroxy, amino, aminocarbonyl, alkylaminocarbonyl, dialkylaminocarbonyl, aminothiocarbonyl, alkylaminothiocarbonyl, dialkylaminothiocarbonyl, nitro, cyano, hydroxycarbonyl and derivative salts, formamido, alkyl, alkoxy, polyhaloalkyl, polyhaloalkoxy, alkoxycarbonyl. substituted amino in which the permissible substituents are the same or different and are one or two propargyl, alkoxyalkyl. alkylthioalkyl, alkyl, alkenyl, haloalkenyl or polyhaloalkenyl; alkylthio, polyhaloalkylthio, alkylsulfinyl, polyhaloalkylsulfinyl, alkylsulfonyl, polyhaloalkylsulfonyl, alkylsulfonylamino, alkylcarbonylamino, polyhaloalkylsulfonylamino, polyhaloalkylcarbonylamino, trialkylsilyl, aryldialkylsilyl, triarylsilyl, sulfonic acid and derivative salts, phosphonic acid and derivative salts, alkoxycarbonylamino, alkylaminocarbonyloxy, dialkylaminocarbonyloxy, alkenyl, polyhaloalkenyl, alkenyloxy, alkynyl, alkynyloxy, polyhaloalkenyloxy, polyhaloalkynyl, polyhaloalkynyloxy, polyfluoroalkanol, cyanoalkylamino, semicarbazonomethyl, alkoxycarbonylhydrazonomethyl, alkoxyiminomethyl, unsubstituted or substituted aryloxyiminomethyl, hydrazonomethyl, unsubstituted or substituted arylhydrazonomethyl, a hydroxy group condensed with a mono-, di- or polysaccharide,

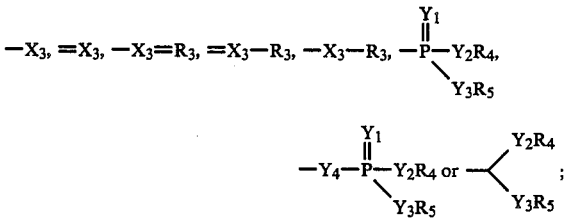

$X_1$, $X_2$ and $X_3$ are independently a oovalent single bond a substltuted or unsubstituted heteroatom or substituted carbon atom, or a substituted or unsubstituted, branched or straight chain containing two or more carbon atoms or heteroatoms in any combination in which the permissible substituents (Z) are the same or different and are one or more hydrogen, halogen, alkylcarbonyl, alkylcarbonylalkyl, alkoxycarbonylalkyl, alkoxycarbonylalkylthio, polyhaloalkenylthio, thiocyano, propargylthio, hydroxyimino, alkoxyimino, trialkylsilyloxy, aryldialkylsilyloxy, triarylsilyloxy, foramidino, alkylsulfamido, dialkylsulfamido, alkoxysulfonyl, polyhaloalkoxysulfonyl, hydroxy, amino, animocarbonyl, alkylaminocarbonyl, ialkylaminocarbonyl, aminothiocarbonyl, alkylaminothiocarbonyl, dialkylaminothiocarbonyl, nitro, cyano, hydroxycarbonyl and derivative salts, formamido, alkyl, alkoxy, polyhaloalkyl, polyhaloalkoxy alkoxycarbonyl, substituted amino in which the permissible substituents are the same or different and are one or two propargyl alkoxyalkyl, alkylthioalkyl, alkyl, alkenyl, haloalkenyl or polyhaloalkenyl; alkylthio, polyhaloalkylthio, alkylsulfinyl, polyhaloalkylsulfinyl, alkylsulfonyl, polyhaloalkylsulfonyl, alkylsulfonylamino, alkylcarbonylamino, polyhaloalkylsulfonylamino, polyhaloalkylcarbonylamino, trialkylsilyl, aryldialkylsilyl, triarylsilyl, sulfonic acid and derivative salts, phosphonic acid and derivative salts, alkoxycarbonylamino, alkylaminocarbonyloxy dialkylaminocarbonyloxy, alkenyl, polyhaloalkenyl, alkenyloxy, alkynyl, alkynyloxy, polyhaloalkenyloxy, polyhaloalkynyl, polyhaloalkynyloxy, polyfluoroalkanol, cyanoalkylamino, semicarbazonomethyl, alkoxycarbonylhydrazonomethyl, alkoxyiminomethyl, unsubstituted or substituted aryloxyiminomethyl, hydrazonomethyl, unsubstituted or substituted arylhydrazonomethyl, a hydroxy group condensed with a mono-, di- or polysaccharide,

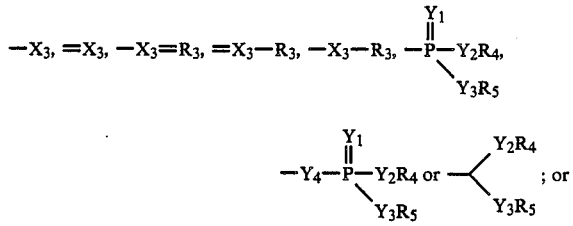

$X_1$ and $R_1$, $X_2$ and $R_2$, $X_3$ and $R_3$ or $R_4$ and $R_5$ may be linked together to form a substituted or unsubstituted heterocyclic ring system which may be saturated or unsaturated and in which the permissible substitutents (Z) are the same or different and are one or more hydrogen, halogen, alkylcarbonyl, alkylcarbonylalkyl, alkoxycarbonylalkyl, alkoxycarbonylalkylthio, polyhaloalkenylthio, thiocyano, propargylthio, hydroxyimino, alkoxyimino, trialkylsilyloxy, aryldialkylsilyloxy, triarylsilyloxy, foramidino, alkylsulfamido, dialkylsulfamido, alkoxysulfonyl, polyhaloalkoxysulfonyl, hydroxy, amino, aminocarbonyl, alkylaminocarbonyl, dialkylaminocarbonyl, aminothiocarbonyl, alkylaminothiocarbonyl, dialkylaminothiocarbonyl, nitro, cyano, hydroxycarbonyl and derivative salts, formamido, alkyl, alkoxy, polyhaloalkyl, polyhaloalkoxy, alkoxycarbonyl, substituted amino in which the permissible substituents are the same or different and are one or two propargyl, alkoxyalkyl, alkylthioalkyl, alkyl, alkenyl, haloalkenyl or polyhaloalkenyl; alkylthio, polyhaloalkylthio, alkylsulfinyl, polyhaloalkylsulfinyl, alkylsulfonyl, polyhaloalkylsulfonyl, alkylsulfonylamino, alkylcarbonylamino, polyhaloalkylsulfonylamino, polyhaloalkylcarbonylamino, trialkylsilyl, aryldialkylsilyl, triarylsilyl, sulfonic acid and derivative salts, phosphonic acid and derivative salts, alkoxycarbonylamino, alkylaminocarbonyloxy, dialkylaminocarbonyloxy, alkenyl, polyhaloalkenyl, alkenyloxy, alkynyl, alkynyloxy, polyhaloalkenyloxy, polyhaloalkynyl, polyhaloalkynyloxy, polyfluoroalkanol, cyanoalkylamino semicarbazonomethyl, alkoxycarbonylhydrazonomethyl, alkoxyiminomethyl, unsubstituted or substituted aryloxyiminomethyl, hydrazonomethyl, unsubstituted or substituted arylhydrazonomethyl, a hydroxy group condensed with a mono-, di- or polysaccharide,

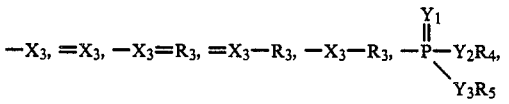

-continued

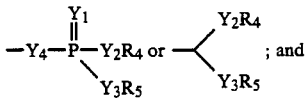

; and a is a value of 0 to 2 and b is a value of 0 or 1 provided that when a is 1 or 2 then b is 0 and when b is 1 then a is 0;

wherein:

$R_3$ is a substituted or unsubstituted, carbocyclic or heterocyclic ring system selected from a monocyclic aromatic or nonaromatic ring system, a bicyclic aromaic or nonaromatic ring system, and a bridged ring system which may be saturated or unsaturated in which the permissible substituents (Z) are the same or different and are one or more hydrogen, halogen, alkylcarbonyl, alkylcarbonylalkyl, alkoxycarbonylalkyl, alkoxycarbonylalkylthio, polyhaloalkenylthio, thiocyano, propargylthio, hydroxyimino, alkoxyimino, trialkylsilyloxy, aryldialkylsilyloxy, triarylsilyloxy, foramidino, alkylsulfamido, dialkylsulfamido, alkoxysulfonyl, polyhaloalkoxysulfonyl, hydroxy, amino, aminocarbonyl, alkylaminocarbonyl, dialkylaminocarbonyl, aminothiocarbonyl, alkylaminothiocarbonyl, dialkylaminothiocarbonyl, nitro, cyano, hydroxycarbonyl and derivative salts, formamido, alkyl, alkoxy, polyhaloalkyl, polyhaloalkoxy, alkoxycarbonyl, substituted amino in which the permissible substituents are the same or different and are one or two propargyl, alkoxyalkyl, alkylthioalkyl, alkyl, alkenyl, haloalkenyl or polyhaloalkenyl; alkylthio, polyhaloalkylthio, alkylsulfinyl, polyhaloalkylsulfinyl, alkylsulfonyl, polyhaloalkylsulfonyl, alkylsulfonylamino, alkylcarbonylamino, polyhaloalkylsulfonylamino, polyhaloalkylcarbonylamino, trialkylsilyl, aryldialkylsilyl, triarylsilyl, sulfonic acid and derivative salts, phosphonic acid and derivative salts, alkoxyoarbonylamino, alkylaminocarbonyloxy, dialkylaminocarbonyloxy, alkenyl, polyhaloalkenyl, alkenyloxy, alkynyl, alkynyloxy, polyhaloalkenyloxy, polyhaloalkynyl, polyhaloalkynyloxy, polyfluoroalkanol, cyanoalkylamino, semicarbazonomethyl, alkoxycarbonylhydrazonomethyl, alkoxyiminomethyl, unsubstituted or substituted aryloxyiminomethyl, hydrazonomethyl, unsubstituted or substituted arylhydrazonomethyl, a hydroxy group condensed with a mono-, di- or polysaccharide,

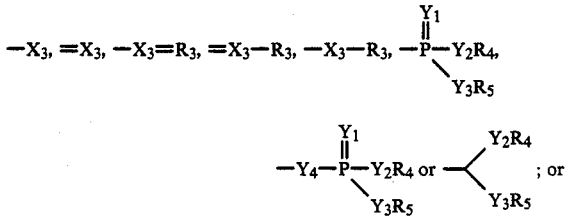

$R_3$ is a substituted heteroatom or substituted carbon atom, or a substituted or unsubstituted, branched or straight chain containing two or more carbon atoms or heteroatoms in any combination in which the permissible substituents (Z) are the same or different and are one or more hydrogen, halogen, alkylcarbonyl, alkylcarbonylalkyl, alkoxycarbonylalkyl. alkoxycarbonylalkylthio, polyhaloalkenylthio, thiocyano, propargylthio, hydroxyimino, alkoxyimino, trialkylsilyloxy, aryldialkylsilyloxy, triarylsilyloxy, foramidino, alkylsulfamido, dialkylsulfamido, alkoxysulfonyl, polyhaloalkoxysulfonyl, hydroxy, amino, aminocarbonyl, alkylaminocarbonyl, dialkylaminocarbonyl, aminothiocarbonyl, alkylaminothiocarbonyl, dialkylaminothiocarbonyl, nitro, cyano, hydroxycarbonyl and derivative salts. formamido, alkyl, alkoxy, polyhaloalkyl, polyhaloalkoxy, alkoxycarbonyl, substituted amino in which the permissible substituents are the same or different and are one or two propargyl, alkoxyalkyl, alkylthioalkyl, alkyl, alkenyl, haloalkenyl or polyhaloalkenyl; alkylthio, polyhaloalkylthio, alkylsulfinyl, polyhaloalkylsulfinyl alkylsulfonyl, polyhaloalkylsulfonyl, alkylsulfonylamino, alkylcarbonylamino polyhaloalkylsulfonylamino, polyhaloalkylcarbonylamino, trialkylsilyl, aryldialkylsilyl, triarylsilyl, sulfonic acid and derivative salts, phosphonic acid and derivative salts, alkoxycarbonylamino, alkylaminocarbonyloxy dialkylaminocarbonyloxy, alkenyl, polyhaloalkenyl, alkenyloxy, alkynyl, alkynyloxy, polyhaloalkenyloxy, polyhaloalkynyl, polyhaloalkynyloxy, polyfluoroalkanol, cyanoalkylamino, semicarbazonomethyl, alkoxycarbonylhydrazonomethyl, alkoxyiminomethyl, unsubstituted or substituted aryloxyiminomethyl, hydrazonomethyl, unsubstituted or substituted arylhydrazonomethyl, a hydroxy group condensed with a mono-, di- or polysaccharide,

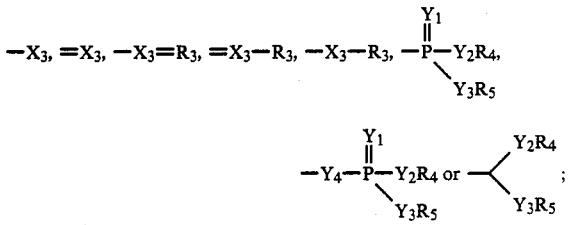

$Y_1$ and $Y_4$ are independently oxygen or sulfur;

$Y_2$ and $Y_3$ are independently oxygen, sulfur, amino or a covalent bond; and $R_4$ and $R_5$ are independently a substituted or unsubstituted alkyl, polyhaloalkyl, phenyl or benzyl in which the permissible substituents (Z) are the same or different and are one or more hydrogen, halogen, alkylcarbonyl, alkylcarbonylalkyl, alkoxycarbonylalkyl, alkoxycarbonylalkylthio, polyhaloalkenylthio, thiocyano, propargylthio, hydroxyimino, alkoxyimino, trialkylsilyloxy, aryldialkylsilyloxy, triarylsilyloxy, foramidino, alkylsulfamido, dialkylsulfamido, alkoxysulfonyl, polyhaloalkoxysulfonyl, hydroxy, amino, aminocarbonyl, alkylaminocarbonyl, dialkylaminocarbonyl, aminothiocarbonyl alkylaminothiocarbonyl, dialkylaminothiocarbonyl, nitro, cyano, hydroxycarbonyl and derivative salts, formamido, alkyl, alkoxy, polyhaloalkyl, polyhaloalkoxy, alkoxycarbonyl, substituted amino in which the permissible substituents are the same or different and are one or two propargyl, alkoxyalkyl, alkylthioalkyl, alkyl, alkenyl, haloalkenyl or polyhaloalkenyl; alkylthio, polyhaloalkylthio, alkylsulfinyl, polyhaloalkylsulfinyl, alkylsulfonyl, polyhaloalkylsulfonyl, alkylsulfonylamino, alkylcarbonylamino, polyhaloalkylsulfonylamino, polyhaloalkylcarbonylamino, trialkylsilyl, aryldialkylsilyl, triarylsilyl, sulfonic acid and derivative salts, phosphonic acid and derivative salts, alkoxycarbonylamino, alkylaminocarbonyloxy, dialkylaminocarbonyloxy, alkenyl, polyhaloalkenyl, alkenyloxy, alkynyl, alkynyloxy, polyhaloalkenyloxy, polyhaloalkynyl, polyhaloalkynyloxy, polyfluoroalkanol, cyanoalkylamino, semicarbazonomethyl, alkoxycarbonylhydrazonomethyl, alkoxyiminomethyl, unsubstituted or substituted aryloxyiminomethyl, hydrazonomethyl, unsubstituted or substituted arylhydrazonomethyl, a hydroxy group condensed with a mono-, di- or polysaccharide,

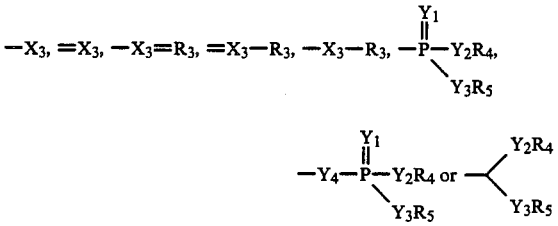

The alkyl-containing moieties above may contain from about 1 to about 100 carbon atoms or greater, preferably from about 1 to about 30 carbon atoms, and more preferably from about 1 to about 20 carbon atoms, The polysaccharide moiety may contain up to about 50 carbon atoms, Monocyclic ring systems emcompassed by $R_1$, $R_2$ and $R_3$ in formula 1 may be represented by generalized formula 2 as follows:

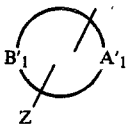

2 wherein $B'_1$ represents a saturated or unsaturated carbon atom and $A'_1$ represents a ring-forming chain of atoms which together with $B'_1$ forms a cyclic system containing from 0 to 3 double bonds or from 0 to 2 triple bonds, $A'_1$ may contain entirely from 2 to 12 carbon atoms, may contain a combination of from 1 to 11 carbon atoms and from 1 to 4 heteroatoms which may be selected independently from N, O, S, P or other heteroatoms, or may contain 4 ring-forming heteroatoms alone.

Ring-forming heteroatoms may in some cases bear oxygen atoms as in aromatic N-oxides and ring systems containing the sulfinyl, sulfonyl, selenoxide and phosphono moieties.

Selected carbon atoms contained in cycles formed by $B'_1$ and $A'_1$ containing more than 3 ring-forming atoms may bear carbonyl, thiocarbonyl, substituted or unsubstituted imino groups or substituted or unsubstituted methylidene groups.

The group designated as Z represents one or more substituents selected independently from among the group of substituents defined for Z herein. When the cycle formed by $B'_1$ and $A'_1$ contains fewer than 4 ring forming members. it should be a saturated carbocycle, i,e, cyclopropyl. When the cycle formed by $B'_1$ and $A'_2$ contains fewer than 5 ring-forming members, it should contain no more than 1 heteroatom.

Illustrative monocyclic ring structures which are encompassed by $R_1$, $R_2$ and $R_3$ in formula 1 include the following:

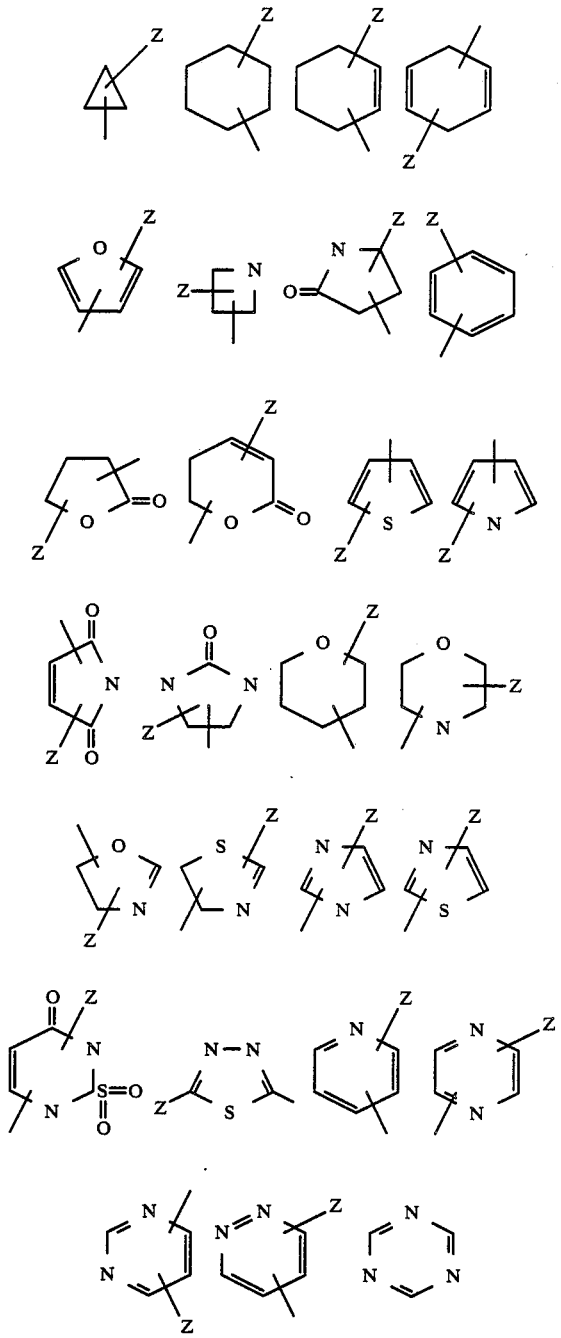

wherein Z is as defined herein,.

Bicyclic ring systems encompassed by $R_1$, $R_2$ and $R_3$ in formula 1 may be represented by generalized formulae 3 and 4 as follows:

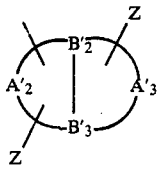

3

-continued

4

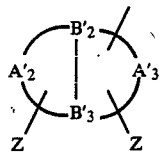

wherein $B'_2$ and $B'_3$ may be independently a saturated or unsaturated carbon atom or a saturated nitrogen atom, $A'_2$ and $A'_3$ independently represent the ring-forming chains of atoms described below and Z represents one or more substituents selected independently from among the group of substituents defined for Z herein. Combinations of $A'_2$ and $A'_3$ may contain in combination with either $B'_1$ or $B'_2$, but not both, from 0 to 2 double bonds. $A'_2$ and $A'_3$, independent of $B'_2$ and $B'_3$, may contain entirely from 1 to 11 carbon atoms, may contain a combination of 1 to 3 heteroatoms which may be selected independently from among N, O, S, P or other heteroatoms together with from 1 to 10 carbon atoms or may contain from 1–3 ring-forming heteroatoms alone.

Ring-forming heteroatoms may in some cases bear oxygen atoms, as in aromatic N-oxides and ring systems containing the sulfinyl, sulfonyl, selenoxide and phosphono groups. Selected carbon atoms contained in $A'_2$ and $A'_3$ may bear carbonyl, thiocarbonyl, substituted or unsubstituted imino groups or substituted or unsubstituted methylidene groups, In regard to structures encompassed within formulae 3 and 4, it is noted as follows:

(a) When $B'_2$ and $B'_3$ are both nitrogen, the groups $A'_2$ and $A'_3$ should each contain no fewer than three ring atoms;

(b) When $B'_2$ but not $B'_3$ is nitrogen, either of $A'_2$ or $A'_3$ should contain at least three ring atoms and the other at least two ring atoms;

(c) When either of groups $A'_2$ or $A'_3$ oontains fewer than three ring atoms, the other should contain at least three ring atoms and the bridgehead atoms should be saturated:

(d) When the group $A'_2$ or $A'_3$ contains a carbon atom bearing a carbonyl, thiocarbonyl, imino or methylidene group, it should together with $B'_2$ and $B'_3$ form a cycle having at least four members;

(e) When a annular double bond is exocyclic to either of the two rings represented in structures 3 and 4, it should be contained in a ring containing at least five members and be exocyclic to a ring containing at least five members: and (f) When a group $A'_2$ or $A'_3$ is joined to the bridgehead atoms $B'_1$ and $B'_2$ by 2 double bonds, the group $A'_2$ or $A'_3$ is understood to contain one double bond and the bridgehead atoms are considered to be unsaturated.

It is recognized that bicyclic ring systems defined for $R_1$, $R_2$ and $R_3$ may be spirocyclic ring systems and are not limited to the fused bicyclic structures of formulae 3 and 4, Spirocyclic ring systems may be saturated or unsaturated carbocyclic or heterocyclic and may be independently substituted by one or more substituents Z as defined herein.

Illustrative byciclic ring structures which are encompassed by $R_1$, $R_2$ and $R_3$ in formula 1 included the following:

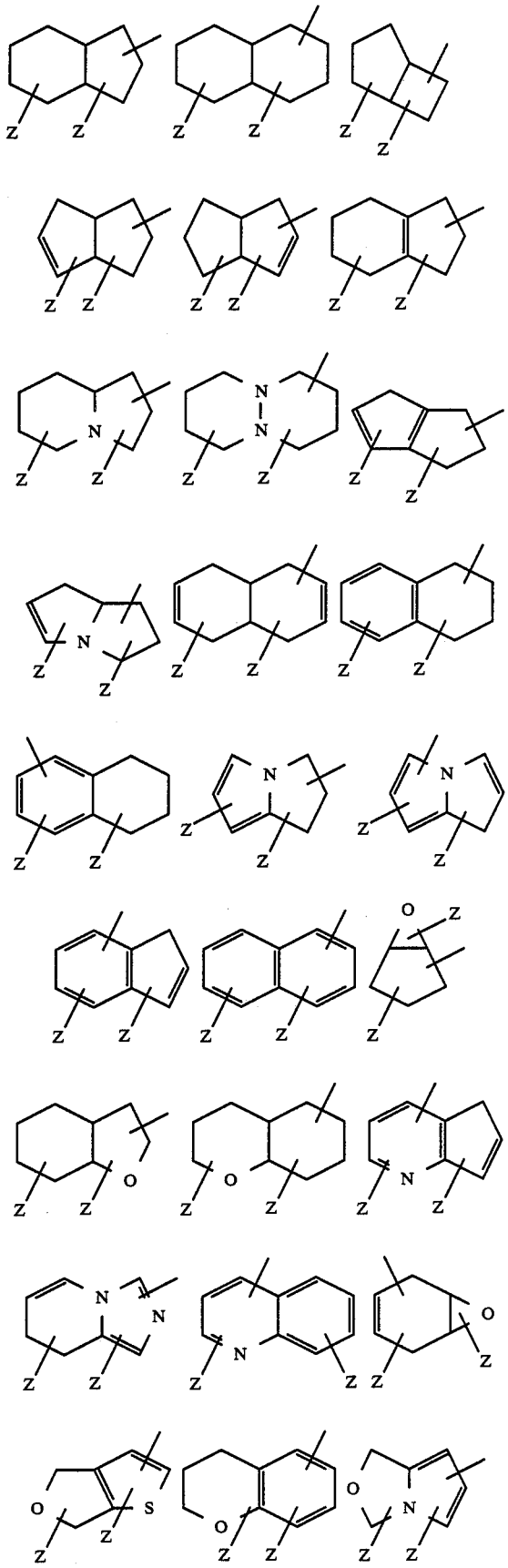

-continued
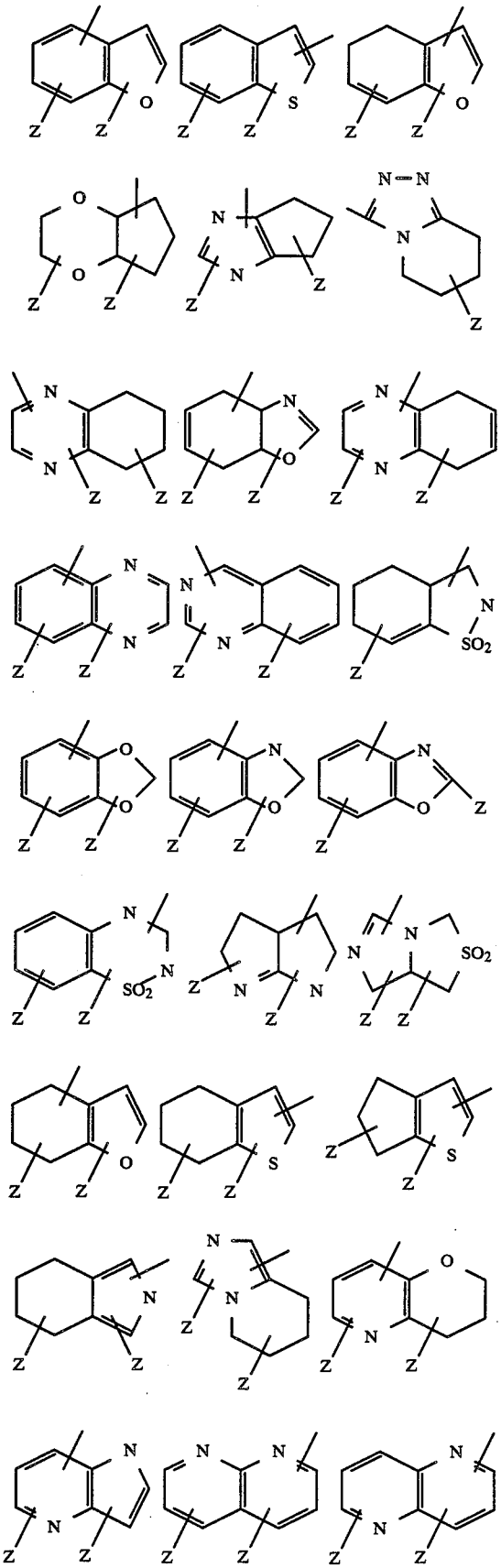
-continued
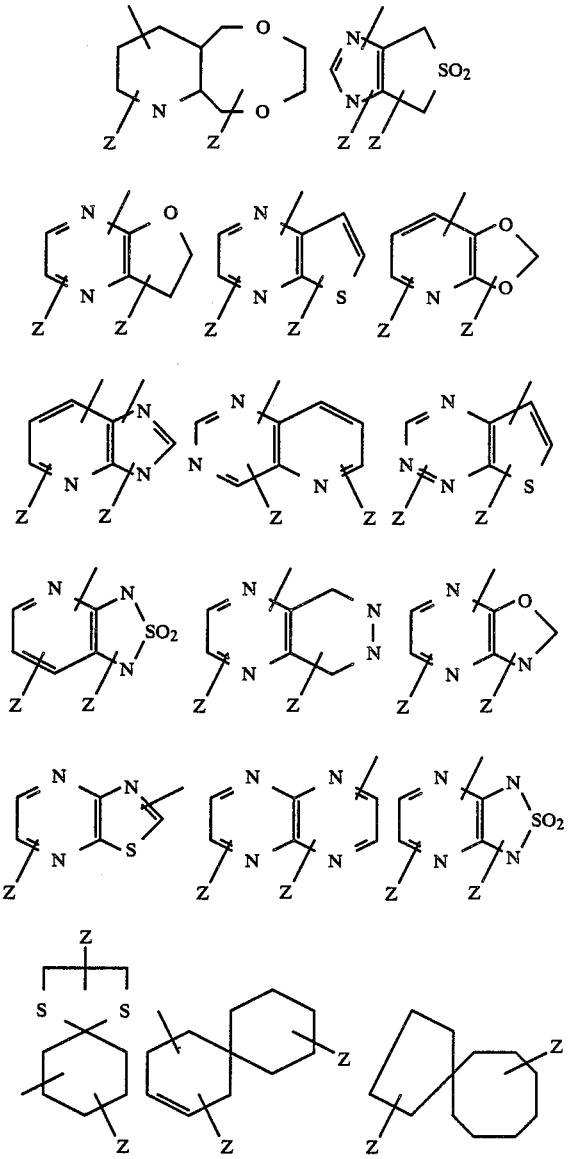
Bridged bicyclic structures encompassed by $R_1$, $R_2$ and $R_3$ in formula 1 may be represented by generalized formulae 5, 6, and 7 as follows:
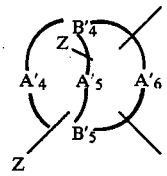
5
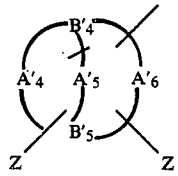
6

-continued

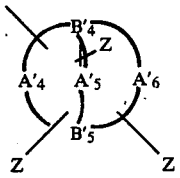

wherein $B'_4$ and $B'_5$ may be independently a saturated carbon atom optionally substituted by Z or a nitrogen atom, and the groups $A'_4$, $A'_5$ and $A'_6$ independently represent ring-forming chains of atoms which may contain, independently of $B'_4$ and $B'_5$, from 0–2 double bonds. The groups Z represent one or more substituents selected independently from among the groups of substituents defined for Z herein, .

The ring-forming elements of $A'_4$, $A'_5$ and $A'_6$ independent of $B'_4$ and $B'_5$, may contain entirely from 1–11 carbon atoms, may contain a combination of from 1–10 carbon atoms and from 1–3 heteroatoms which may be selected independently from among N, O, S, P or other heteroatoms, or may contain from 1–3 heteroatoms alone with the proviso that when one of the groups $A'_4$, $A'_5$ and $A'_6$ is a single heteroatom, the other two groups should contain two or more ring-forming atoms. A second proviso is that when one or both of the groups $B'_4$ and $B'_5$ is nitrogen the groups $A'_4$, $A'_5$ and $A'_6$ should contain at least two saturated ring-forming atoms.

Ring-forming heteroatoms may in some cases bear oxygen atoms as in the sulfinyl, sulfonyl, selenoxide and phosphono moieties, Selected carbon atoms contaned in $A'_4$, $A'_5$ and $A'_6$ may bear one or more carbonyl, thiocarbonyl or substituted or unsubstituted imino groups.

Illustrative bridged bicyclic structures which are encompassed by $R_1$, $R_2$ and $R_3$ in formula 1 include the following:

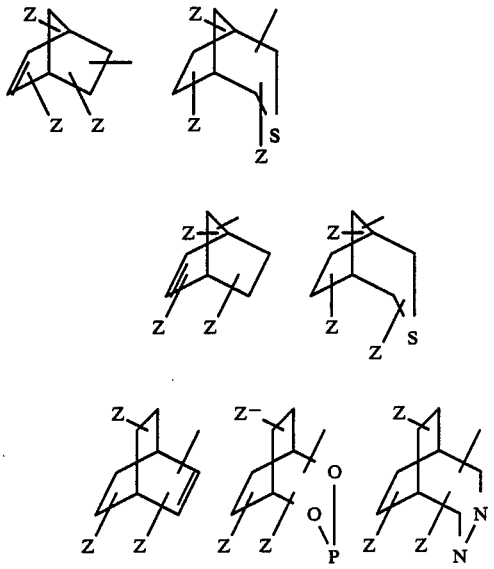

-continued

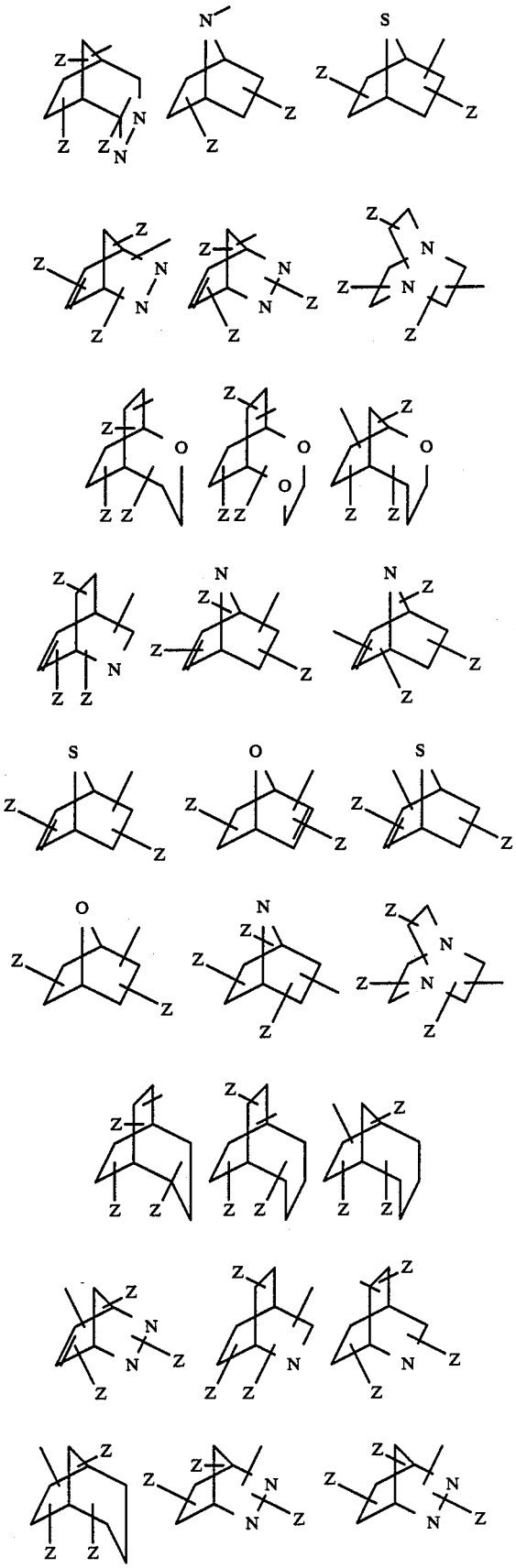

-continued

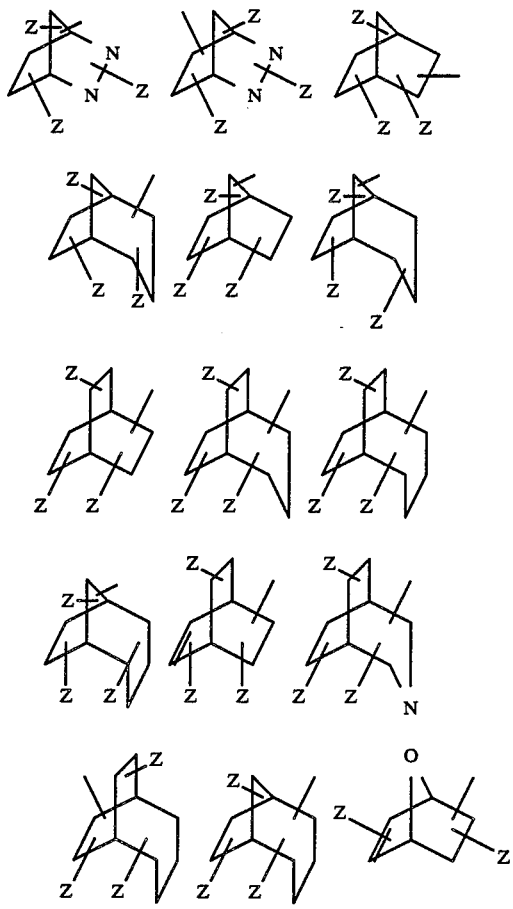

The substituents $X_1$, $X_2$ and $X_3$ may independently be an unsubstituted heteroatom such as an oxygen or sulfur, as in carbonyl and thiocarbonyl systems. The substituents $X_1$, $X_2$, $X_3$, $R_1$, $R_2$ and $R_3$ may independently be a substituted heteroatom or carbon atom. $X_1$, $X_2$ and $X_3$ independently may also be a covalent single bond, or an array of atoms serving to join the substituents $R_1$, $R_2$ and $R_3$ respectively to the remainder of the sulfur-containing molecule. The group $X_3$ may be joined to the substituent $R_3$ by means of a single or double bond. Likewise, $X_3$ may be attached to the remainder of the sulfur-containing molecule by means of a double or single bond, $X_1$, $X_2$, $X_3$, $R_1$, $R_2$ and $R_3$ independently may be a saturated or unsaturated, branched or straight chain of carbon atoms; a branched or straight, saturated or unsaturated chain of atoms consisting of both carbon atoms and heteroatoms; or may be a branched or straight saturated or unsaturated chain consisting entirely of heteroatoms. Selected heteroatomic components of $X_1$, $X_2$, $X_3$, $R_1$, $R_2$ and $R_3$ may bear oxygen atoms as in the case of groups containing the sulfonyl, sulfinyl, N-oxide and phosphono moieties. Selected heteroatomic components of $X_1$, $X_2$, $X_3$, $R_1$, $R_2$ and $R_3$ may bear one or more substituents Z as defined herein, Selected carbon atoms participating in $X_1$, $X_2$, $X_3$, $R_1$, $R_2$ and $R_3$ may bear carbonyl, thiocarbonyl, substituted or unsubstituted imino, substituted or unsubstituted alkylidene or one or more substituents Z as defined herein.

The combinations of $R_1$ and $X_1$, $R_2$ and $X_2$, $R_3$ and $X_3$, and $R_4$ and $R_5$ may be linked together to form a heterocyclic saturated or unsaturated ring system. This ring system may be part of a saturated or unsaturated, aromatic or nonaromatic, carbo- or hetero-, monoyclic or bicyclic ring system as illustrated hereinabove. Illustrative of suitable heteroatoms include oxygen, sulfur, nitrogen, silicon and phosphorous. The ring system can be optionally substituted with one or more of the substituents Z as defined herein.

$Y_1$ and $Y_4$ may independently be oxygen or sulfur, $Y_2$ and $Y_3$ may independently be oxygen, sulfur, amino or a covalent bond. $R_4$ and $R_5$, in addition to being linked together to form a heterocyclic saturated or unsaturated ring system as described hereinabove, may be independently substituted or unsubstituted alkyl, polyhaloalkyl, phenyl or benzyl in which the permissible substituents are as defined for Z herein.

It is readily apparent that formula 1 encompasses a wide variety of sulfur-containing compounds as more particularly described hereinbelow. For example, U.S. Pat. No. 4,382,957, incorporated herein by reference, discloses and claims symmetrical N-substituted bis-carbamoyl sulfide compounds which are encompassed by the above formula 1 and which may be used in the method of this invention. Such symmetrical N-substituted bis-carbamoyl sulfide compounds can be prepared by the methods described in U.S. Pat. No. 4,382,957, and are available from Union Carbide Agricultural Products Company, Inc. Research Triangle Park, North Carolina. Illustrative of the symmetrical N-substituted bis-carbamoyl sulfide compounds of U.S. Pat. No. 4,382,957 which may be useful in the method of this invention include the following:

N,N'-bis-[1-Methylthioacetaldehyde O-(N-methylcarbamoyl)oxime]sulfide (thiodicarb);

N,N'-bis-[1-Ethylthioacetaldehyde O-(N-methylcarbamoyl)-oxime]sulfide;

N,N'-bis-[1-Isopropylthioacetaldehyde O-(N-methylcarbamoyl)oxime]sulfide;

N,N'-bis-[1-(2-Cyanoethylthio)acetaldehyde O-(N-methylcarbamoyl)oxime]sulfide;

N,N'-bis-[5-Methyl-4-(O-(N-methylcarbamoyl)oximino)1,3-oxathiolane]sulfide;

N,N'-bis-[2-(O-(N-methylcarbamoyl)oximino)-1,4-dithiane]sulfide;

N,N'-bis-[4-(O-(N-methylcarbamoyl)oximino)-1,3-dithiolane]sulfide;

N,N'-bis-[5,5-dimethyl-4-(O-(N-methylcarbamoyl)oximino)-1,3-dithiolane]sulfide;

N,N'-bis-[3,5,5-trimethyl-2-(O-N-methylcarbamoyl)oximino)thiazolidin-4-one]sulfide;

N,N'-bis-[4,5,5-trimethyl-2-(O-(N-methylcarbamoyl-)oximino)-thiazolidin-3-one]sulfide;

N,N'-bis-[2-(O-(N-methylcarbamoyl)oximino)-1,3-dithiolane]sulfide;

N,N'-bis-[2-cyano-2-methylpropionaldehyde O-(N-methylcarbamoyl)oxime]sulfide;

N,N'-bis-[2-nitro-2-methylpropionaldehyde O-(N-methylcarbamoyl)oxime]sulfide;

N,N'-bis-[1-Methylthio-N'',N''-dimethylcarbamoylformaldehyde O-(N-methylcarbamoyl)oxime]sulfide;

N,N'-bis-[4-methyl-2-(O-(N-methylcarbamoyl)oximino)tetrahydro-1,4-thiazin-3-one]sulfide;

N,N'-bis-[3,3-Dimethyl-1-methylthiobutanone-2 O-(N-methylcarbamoyl)oxime]sulfide;

N,N'-bis-[3-Methylthiobutanone-2 O-(N-methylcarbamoyl)oxime]sulfide;

N,N'-bis-[3-Methylsulfonylbutanolne-2 O-(N-methylcarbamoyl)oxime]sulfide;

N,N'-bis-[2-Methylsulfonyl-2-methylpropionaldehyde O-(N-methylcarbamoyl)oxime]sulfide:

N,N'-bis-[1-Methylthiopyruvaldehyde O-(N-methylcarbamoyl)oxime]sulfide;

N,N'-bis-[3,3-Dimethyl-1-methylsulfonylbutanone-2 O-(N-methylcarbamoyl)oxime]sulfide;

N,N'-bis-1-[N-(Dimethylaminomethylene)carbamoyl]-1-methylthioformaldehyde O-(N-methylcarbamoyl-)oxime]sulfide;

N,N'-bis-[1-Methylthio-1-ethoxycarbonylformaldehyde O-(N-methylcarbamoyl)oxime]sulfide;

N,N'-bis-[1,3,5-Oxadithiane-4 O-(N-methylcarbamoyloximino)]sulfide;

N,N'-bis-[1,3,5-Trithiane-2 O-(N-methylcarbamoyloximino)]sulfide;

N,N'-bis-3-[O-(N-methylcarbamoyl)oximino-1,4-oxathiane]sulfide;

N,N'-bis-[1-cyano-2,2-dimethylpropionaldehyde O-(N-methylcarbamoyloxime)]sulfide; and N,N'-bis-[4-methyl-2-(O-(N-methylcarbamoyl)oximinotetrahydro-1,4-thiazine-5-one]sulfide.

U.S. Pat. No. 4,341,795, incorporated herein by reference, discloses and claims asymmetrical N-substituted bis-carbamoyl sulfide compounds which are encompassed by the above formula 1 and which may be used in the method of this invention. Such asymmetrical N-substituted bis-carbamoyl sulfide compounds can be prepared by the methods described in U.S. Pat. No. 4,341,795, and are available from Union Carbide Agricultural Products Company, Inc., Research Triangle Park, N.C. Illustraive of the asymmetrical N-substituted bis-carbamoyl sulfide compounds of U.S. Pat. No. 4,341,795 which may be useful in the method of this invention include the following;

2,3-Dihydro-2,2-dimethyl-7-benzofuranyl N-[N'-(n-butoxycarbonyl)-N'-methylaminosulfenyl]-N-methyl-carbamate;

S-Methyl-N-[N'-(N'-(N''-methyl-N''-(methoxycarbonyl)aminosulfenyl)-N'-methylcarbamoyloxy]thioacetimidate:

S-Methyl-N-[N'-(N''-methyl-N''-(ethoxycarbonyl-)aminosulfenyl)-N'-methylcarbamoyloxy]thioacetimidate;

S-Methyl-N-[N'-(N''-methyl-N''-(butoxycarbonyl-)aminosulfenyl-N'-methylcarbamoyloxy]thioacetimidate:

S-Methyl-N-[N'-(N''-methyl-N''-(t-butoxycarbonyl-)aminosulfenyl)-N'-methylcarbamoyloxy]thioacetimidate;

S-Methyl-N-[N'-(N''-methyl-N''-(2-ethylhexyloxycarbonyl)aminosulfenyl)-N'-methylcarbamoyloxy]thioacetimidate;

S-Methyl-N-[N''-methyl-N''-(n-dodecyloxycarbonyl-)aminosulfenyl)-N'-methyl carbamoyloxy]thioacetimidate:

S-Methyl-N-[N'-(N''-methyl-N'-(n-octadecyloxycarbonyl)aminosulfenyl)-N'-methylcarbamoyloxy]thioacetimidate;

S-Methyl-N-[N'-(N''-methyl-N''-(benzyloxycarbonyl-)aminosulfenyl)-N'-methylcarbamoyloxy]thioacetimidate:

S-Methyl-N-[N'-(N'-methyl-N''-(2-methoxyethoxycarbonyl)aminosulfenyl)-N'-methylcarbamoyloxy]thioacetimidate;

S-Methyl-N-[N'-(N''-methyl-N''-(2-(2-methoxyethoxy)ethoxycarbonyl)aminosulfenyl)-N'-methylcarbamoyloxyoxy]thioacetimidate:

S-Methyl-N-[N'-(N''-methyl-N''-(2-(2-(2-methoxyethoxy)ethoxy)ethoxycarbonyl)aminosulfenyl)-N'-methylcarbamoyl]thioacetimidate:

S-Methyl-N-[N'-(N''-methyl-N''-(2-n-hexyloxyethoxycarbonyl)amlnosulfenyl)-N'-methylcarbamoyloxy]-thioacetimidate;

S-Methyl-N-[N''-methyl-N''-(2-(2-n-hexyloxyethoxy)ethoxycarbonyl)aminosulfenyl)-N'-methylcarbamoyloxy]thioacetimidate:

5-Methyl-4-[[O-[N-methyl-N-(N'-methyl-N'-(ethoxycarbonylaminosulfenyl)carbamoyl]oximino]]-1,3-oxathiolane;

5-Methyl-4-[[O-[N-methyl-N-(N'-methyl-N'-(n-dodecyloxycarbonylaminosulfenyl)carbamoyl]oximino]]-1,3oxathiolane;

5,5-Dimethyl-4-[[O-[N-methyl-N-(N'-methyl-N'-(t-butoxycarbonylaminosulfenyl)carbamoyl]oximino]]-1,3-dithiolane;

5,5-Dimethyl-4-[[O-[N-methyl-N-(N'-methyl-N-(n-dodecyloxycarbonylaminosulfenyl)carbamoyl]oximino]]-1,3dithiolane;

2-[[O-[N-Methyl-N-(N'-methyl-N'-(ethoxycarbonylaminosulfenyl)-carbamoyl]oximino]]-1,4-dithiane;

2-[[O-[N-Methyl-N-(N'-methyl-N'-(n-octadecyloxycarbonylaminosulfenyl)carbamoyl)oximino]]-1,4-dithiane:

S-2-Cyanoethylthio-N-[N'-(N''-methyl-N''-(ethoxycarbonyl)aminosulfenyl-N'-methylcarbamoyloxy]thioacetimidate;

S-2-Cyanoethylthio-N-[-N'-(N''-methyl-N''-(n-dodecyloxycarbonyl)-aminosulfenyl)-N'-methylcarbamyloxy]thioacetimidate:

S-Isopropyl-N-[N'-(N''-methyl-N''-(ethoxycarbonyl-)aminosulfenyl)-N'-methylcarbamoyloxy]thioacetimidate;

S-Isopropyl-N-[N'-(N''-methyl-N''-(2-methoxyethoxycarbonylaminosulfenyl)-N'-methylcarbamoyloxy]-thioacetimidate;

2,3-Dihydro-2,2-dimethyl-7-benzofuranyl N-[N'-(ethoxycarbonyl)-N'-methylaminosulfenyl]-N-methylcarbamate;

2,3-Dihydro-2,2-dimethyl-7-benzofuranyl N-[N'(t-butoxycarbonyl)-N'-methylaminosulfenyl]-N-methylcarbamate;

1-Naphthyl N-methyl-N-[N'-(ethoxycarbonyl)-N'-methylaminosulfenyl]carbamate;

O-Methyl-2-isopropyl-4-[N-(N'-ethoxycarbonyl)-N'-methylaminosulfenyl)-N-methylcarbamoyloxy]carbanilate;

O-Methyl-2,6-dimethyl-4-[N-(N'-(ethoxycarbonyl)-N'-methylaminosulfenyl)-N-methylcarbamoyloxy]carbanilate;

O-[N-(N'-(2-Acetamidoethoxycarbonyl)-N'-butylaminosulfenyl)-N-methylcarbamoyl]-S-ethylacetothiolhydroximate;

O-[N-(N'-(2-Formamidopropycarbonyl)-N'-methylaminosulfenyl)-N-methylcarbamoyl]-S-cyanomethylacetothiolhydroximate;

O-[N-[N'-(2-Methoxycarbonylaminocyclohexyloxycarbonyl)-N-isopropylaminosulfenyl)-N-methylcarbamoyl]-S-methylacetothiolhydroximate;

O-[N-[N'-(2-Methylsulfonyl-2-methylpropoxycarbonyl)-N'-methylaminosulfenyl)-N-methylcarbamoyl]-S-methylacetothiolhydroximate:

O-[N-[N'-(2-Ethylsulfinylbutoxycarbonyl)-N'-ethylaminosulfenyl)-N-ethylcarbamoyl]-S-methylacetothiolhydroximate;

O-[N-(N'-(1-naphthylmethoxycarbonyl)-N'-methylaminosulfenyl)-N-methylcarbamoyl)-S-methylacetothiolhydroximate;

O-[N-(N'-Cyclopentyloxycarbonyl-N'-methylaminosulfenyl)-N-methylcarbamoyl]-S-methylacetothiolhydroximate;

O-[N-(N'-Cyclohexyloxycarbonyl-N'-methylaminosulfenyl)N-methylcarbamoyl]-S-methylacetothiolhydroximate;

O-[N-(N'-o-Chlorobenzyloxycarbonyl-N'-methylaminosulfenyl)-N-methylcarbamoyl]-S-methylacetothiolhydroximate:

O-[N-(N'-m-Chlorobenzyloxycarbonyl-N'-methylaminosulfenyl)-N-methylcarbamoyl]-S-methylacetothiolhydroximate;

O-[N-(N'-p-Chlorobenzyloxycarbonyl-N'-methylaminosulfenyl)-N-methylcarbamoyl]-S-methylacetothiolhydroximate;

O-[N-(N'-o-Methoxybenzyloxycarbonyl-N'-methylaminosulfenyl)-N-methylcarbamoyl]-S-ethylacetothiolhydroximate;

O-[N-(N'-m-Methoxybenzyloxycarbonyl-N'-methylaminosulfenyl)-N-methylcarbamoyl]-S-propylacetothlolhydroximate;

O-[N-(N'-p-Methoxybenzyloxycarbonyl-N'-methylaminosulfenyl)-N-methylcarbamoyl]-S-(2-cyanoethyl)acetothiolhydroximate;

O-[N-(N'-o-Nitrobenzyloxycarbonyl-N'-methylaminosulfenyl)-N-methylcarbamoyl]-S-methylacetothilhydroxime;

O-[N-(N'-m-Nitrobenzyloxycarbonyl-N'-methylaminosulfenyl)-N-methylcarbamoyl]-S-isopropylacetothiolhydroximate;

O-[N-(N'-p-Nitrobenzyloxycarbonyl-N'-methylaminosulfenyl-N-methylcarbamoyl]-S-methyacetothiolhydroximate;

O-[N-(N'-Furfuryloxycarbonyl-N'-methylaminosulfenyl)-N-methylcarbamoyl]-S-methylacetothiolhydroximate;

O-[N-(N'-2-Pyridylmethyloxycarbonyl-N'-methylaminosulfenyl)-N-methylcarbamoyl]-S-ethylacetothiolhydroximate;

O-[N-(N'-2-Thiophenemethyloxycarbonyl-N'-methylaminosulfenyl)-N-methylcarbamoyl]-S-methylacetothiolhydroximate;

3-Chlorophenyl-N-[N'-methyl-N'-(2-chloroethoxycarbonyl)aminosulfenyl]-N-methylcarbamate;

2-Isopropoxyphenyl N-[[N'-2-(N''-methylacetamido)ethoxycarbonyl]-N'-butylaminosulfenyl]]-N-methylcarbamate;

3,5-Dimethylphenyl N-[N'-methyl-N'-(2,2,2-trichloroethoxycarbamoyl(aminosulfenyl]-N-methylcarbamate;

3,5-Dimethyl-4-methylsulfinylphenyl N-[N'-methyl-N'-(2,2,2-trichloroethoxycarbonyl)aminosulfenyl]-N-methylcarbamate;

3,5-Dimethyl-4-methylsulfonylphenyl N-[N'-methyl-N'-(2-methylthioethoxycarbonyl)aminosulfenyl]-N-methylcarbamate;

3,5-Dimethyl-4-N,N-dimethylaminophenyl N'-[N''-methyl-N''-(2-nitrobenzyloxycarbonyl)aminosulfenyl]-N'-methylcarbamate;

3,5-Dimethyl-4-acetamidophenyl N-[N'-methyl-N'-(2-methylsulfinylethoxycarbonyl)aminosulfenyl]-N-methyl-carbamate;

3-Methyl-4-(dimethylaminoemethyleneimino)phenyl N-[N'-methyl-N'-(2-methylsulfonylethoxycarbonyl-)aminosulfenyl]-N-methylcarbamate;

3-Isopropyl-4-formoaminophenyl N-[N'-ethyl-N'-(2-cyanoethoxycarbonyl)aminosulfenyl]-N-methylcarbamate;

3-Isopropylphenyl N-[N'-methyl-N'-(2-nitroethoxycarbonyl)-aminosulfenyl]-N-methylcarbamate;

2-[N-[N'-(cyclohexyloxycarbonyl)-N'-methylaminosulfenyl]N-methylcarbamoyloxyimino]-4-methyl-1,4-tetrahydrothiazin-3-one:

2-[N-[N'-(cycopentyloxycarbonyl)-N'-methylaminosulfenyl]-N-methylcarbamoyloxyimino]-1,4-tetrahydrothiazin-3-one;

O-[N-(N'-(3,4-Dichlorobenzyloxycarbonyl)-N'-methylaminosulfenyl)-N-methylcarbamoyl]-S-methyl-1-(dimethylaminocarbonyl)formothiolhydroximate;

O-[N-(N'-(4-t-Butylbenzyloxycarbonyl]-N'-methylaminosulfenyl)-N-methycarbamoyl]-S-methyl-1-(methylaminocarbonyl)formothiolhydroximate;

O-[N-(N'-(3-methylthiobenzyloxycarbonyl)-N'-methylaminosulfenyl)-N-methylcarbamoyl]-S-methyl-1-(aminocarbonyl)-formothiolhydroximate;

2,6-Di-t-butyl-4-(2',2'-dicyanoethylidenyl)phenyl N-[N'-methyl-N'-(cyclohexyloxycarbonyl)aminosulfenyl]-N-methylcarbamate;

O-[N-[N'-Methyl-N'-(butoxycarbonyl)aminosulfenyl]-N-methylcarbamoyl]-2-methyl-2-cyano-propionaldoxime;

O-[N-[N'-Methyl-N'-(propoxycarbonyl)aminosulfenyl]-N-methylcarbamoyl]-2-methyl-2-(methylthio)-propionaldoxime;

O-[N-[N'-Methyl-N'-(ethoxycarbonyl)aminosulfenyl]-N-methylcarbamoyl)-2-methyl-2-nitro-propionaldoxime;

O-[(N-[N'-Methyl-N'-(methoxycarbonyl)aminosulfenyl]-N-methylcarbamoyl]-2-methyl-2-methylsulfinyl-propionaldoxime;

O-[N-[N'-Methyl-N'-(2-ethylhexyloxycarbonyl)aminosulfenyl]-N-methylcarbamoyl]-2-methyl-2-methylsulfonyl-propionaldoxime;

O-[N-[N'-Methyl-N'-(n-octyloxycarbonyl)aminosulfenyl]-N-methylcarbamoyl]-2-methyl-2-formamido-propionaldoxime;

O-[N-[N'-Methyl-N'-(n-dodecyloxycarbonyl)aminosulfenyl]-N-methylcarbamoyl]-2-methyl-2-acetamido-propionaldoxime;

O-[N-(N'-Methyl-N'-(2-ethylhexyloxycarbonyl-)aminosulfenyl)-N-methylcarbamoyl]-1-cyano-1-(t-butyl)-formohydroximate;

O-[N-[N'-(Butoxycarbonyl)-N'-methylaminosulfenyl]-N-methylcarbamoyl]-1-(methylthio)-3,3-dimethyl-2-butanone oxime;

O-[N'-[N'-(2-Ethylhexyloxycarbonyl)-N'-methylaminosulfenyl]-N-methylcarbamoyl]-1-(methylthio)-3,3-dimethyl-2-butanone oxime;

O-[N-[N'-(n-Octyloxycarbonyl)-N'-methylaminosulfenyl]-N-methylcarbamoyl]-1-(methylsulfinyl)-3,3-dimethyl-2-butanone oxime;

O-[N-[N'-(n-Pentoxycarbonyl)-N'-methylaminosulfenyl]-N-methylcarbamoyl]-2-(methylsulfonyl)-3,3-dimethyl-2-butanone oxime; and O-[N-[N'-(Butoxycarbonyl)-N'-methylaminosulfenyl]-N-methylcarbamoyl]-3-(methylsulfonyl)-2-butanone oxime.

U.S. Pat. No. 4,551,472, incorporated herein by reference, discloses and claims unsymmetrical N-substituted bis-carbamoyl sulfide compounds which are encompassed by the above formula 1 and which may be used in the method of this invention. Such unsymmetrical N-substituted bis-carbamoyl sulfide compounds can be prepared by the methods described in U.S. Pat. No. 4,551,472, and are available from Union Carbide Agricultural Products Company, Inc., Research Triangle Park, N.C. Illustrative of the unsymmetrical N-substituted bis-carbamoyl sulfide compounds of U.S. Pat. No. 4,551,472 which may be useful in the method of this invention include the following:

N-[2-Methylthio-2-methylpropionaldehyde-O-(N-methylcarbamoyl)oxime] N-[1-methylthioacetaldehyde O-(N-methylcarbamoyl)oxime]sulfide;

N-[1-Methylthioacetaldehyde O-(N-methylcarbamoyl-)oxime]N-[2-O-(N-methylcarbamoyl)oximino-1,4-dithiane]sulfide;

N-[1-Methylthioacetaldehyde O-(N-methylcarbamoyl-)oxime]N-[2,3-dihydro-2,2,-dimethyl-7-(N-methylcarbamoyloxy)benzofuran] sulfide;

N-[1-Methylthioacetaldehyde O-(N-methylcarbamoyl-)oxime]N-(3-isopropylphenyl N-methylcarbamate) sulfide;

N-[1-Methylthioacetaldehyde O-(N-methylcarbamoyl-)oxime]N-(1-naphthyl N-methylcarbamate) sulfide:

N-[2-Methylthio-2-methylpropionaldehyde O-(N-methylcarbamoyl)oxime]N-(1-naphthyl N-methylcarbamate) sulfide;

N-[1-Methylthioacetaldehyde O-(N-methylcarbamoyl-)oxime]N-(2-isopropoxyphenyl N-methylcarbamate) sulfide;

N-[1-Methylthioacetaldehyde O-(N-methylcarbamoyl-)oxime N-(4-dimethylamino-3,5-xylyl N-methylcarbamate) sulfide:

N-[2-Methylthio-2-methylpropionaldehyde O-(N-methylcarbamoyl)oxime] N-(3-isopropyl-4-methoxycarbonylaminophenyl N-methylcarbamate) sulfide;

N-[2-Methylthio-2-methylpropionaldehyde O-(N-methylcarbamoyl)-oxime[N-[2,3-dihydro-2,2-dimethyl-7-(N-methylcarbamoyloxy)benzofuran] sulfide;

N-[1-Methylthio-N',N'-dimethylcarbamoylformaldehyde O-(N-methylcarbamoyl)oxime] N-[1-methylthoacetaldedehyde O-(N-methylcarbamoyl)oxime] sulfide;

N-[2-Methylsulfonyl-2-methylpropionaldehyde O-(N-methylcarbamoyl)oxime] N-[2,3 dihydro-2,2-dimethyl-7-(N-methylcarbamoyloxy)benzofuran] sulfide;

N-[2-O-(N-methylcarbamoyl)oximino-1,4-dithiane]N-(3-isopropylphenyl N-methylcarbamate) sulfide;

N-[1-Methylthioacetaldehyde O-(N-methylcarbamoyl-)oxime N-[4-(N',N'-dimethylformamidino)-3,5-xylyl N-methylcarbamate] sulfide;

N-[1-Methylthioacetaldehyde O-(N-methyloacbamoyl-)oxime N-[(N',N'-dimethylaminomethylenecarbamoyl)-1-methylthioformaldehyde O-(N-methylcarbamoyl)oxime] sulfide;

N-[2-Methylthio-2-methylpropionaldehyde O-(N-methylcarbamoyl)oxime] N-(4-dimethylamino-3,5-xylyl N-methylcarbamate) sulfide;

N-[3,3-Dimethyl-1-methylthiobutanone-2O-(N-methylcarbamoyl)oxime] N-[1-methylthioacetaldehyde O-(N-methylcarbamoyl)oxime] sulfide;

N-[3,3-Dimethyl-1-methylsulfonylbutanone-2O-(N-methylcarbamoyl)oxime] N-[2,3-dihydro-2,2-dimethyl-7-(N-methylcarbamoyloxy)benzofuran] sulfide;

N-[3-Methylsulfonylbutanone-2 O-(N-methylcarbamoyl)oxime] N-[2,3-dihydro-2,2-dimethyl-7-(N-methylcarbamoyloxy)benzofuran] sulfide:

N-[3,3-Dimethyl-1-methylthiobutanone-2 O-(N-methylcarbamoyl)oxime] N-[1-methylthioacetaldehyde O-(N-methylcarbamoyl)oxime] sulfide;

N-[2-Cyano-2-methylpropionaldehyde O-(N-methylcarbamoyl) oxime]N-(1-naphthyl N-methylcarbamate) sulfide;

N-[1-Methylthio-N',N'-dimethylcarbamoylformaldehyde O-(N-methylcarbamoyl)oxime) N-[2,3-dihydro 2,2-dimethyl-7-(N-methylcarbamoyloxy)benzofuran] sulfide;

N-[1-Methylthiopyruvaldehyde O-(N-methylcarbamoyl)oxime] N-[1-methylthioacetaldehyde O-(N-methylcarbamoyl) oxime] sulfide;

N-[2-O-(N-methylcarbamoyl)oximino-1,3-dithiolane]N-(1-naphthyl N-methylcarbamate) sulfide;

N-[5-Methyl-4 O-(N-methylcarbamoyl)oximino-1,3-dithiolane] N-(1-naphthyl N-methylcarbamate) sulfide;

N-[1-(2-cyanoethylthio)acetaldehyde O-(N-methylcarbamoyl) oxime] N-(1-naphthyl N-methylcarbamate) sulfide;

N-[1-(2-cyanoethylthio)acetaldehyde O-(N-methylcarbamoyl)oxime] N-[2,3-dihydro-2,2-dimethyl-7-(N-methylcarbamoyloxy)benzofuran] sulfide;

N-[4,5,5-Trimethyl-2 O-(N-methylcarbamoyl)oximinothiazolidin-3-one] N-[1-methylthioacetaldehyde O-(N-methylcarbamoyl)oxime] sulfide;

N-[4,5,5-Trimethyl-2 O-(N-methylcarbamoyl)oximinothiazolidin-3-one[N-[3,5,5-trimethyl-2 O-(N-methylcarbamoyl)oximinothiazolidin-4-one] sulfide;

N-[4-Methyl-2, O-(N-methylcarbamoyl)oximino-tetrahydro-1,4-thiazine-3-one]N-(1-naphthyl N-methylcarbamate) sulfide;

N-[4-Methyl-2 O-(N-methylcarbamoyl)oximino-tetrahydro-1,4-thiazine-3-one]N-[1-(2-cyanoethylthio) acetaldehyde O-(N-methylcarbamoyl)oxime]sulfide;

N-[4-Methyl-2 O-(N-methylcarbamoyl)oximino-tetrahydro-1,4-thiazine-3-onej N-[1-methylthioacetaldehyde O-(N-methylcarbamoyl)oxime sulfide;

N-[5,5-Dimethyl-4 O-(N-methylcarbamoyl)oximino 1,3-dithiolane]N-(1-naphthyl N-methylcarbamate) sulfide;

N-[2-(O-(N-methylcarbamoyl)oximino-4,4-dithiane]N-[4-dimethylamino-3,5-xylyl N-methylcarbamate] sulfide;

N-[2-(O-(N-methylcarbamoyl)oximino-1,4-dithiane]N-[3-isopropyl-4-methoxycarbonylamino-(N-methylcarbamoyloxy)benzene] sulfide;

N-[1-(2-cyanoethylthio)acetaldehyde O-(N-methylcarbamoyl)oxime] N-[2-(2-dithiolanyl) phenyl N-methyl carbamate] sulfide;

N-[1-(2-cyanoethylthio)acetaldehyde O-(N-methylcarbamoyl)oxime] N-[2-(2-dioxalanyl) phenyl-N-methylcarbamate] sulfide;

N-[1-isopropylthioacetaldehyde O-(N-methylcarbamoyl)oxime] N-(2-propynyloxy phenyl N-methylcarbamate] sulfide;

N-[2,3-dihydro-2,2-dimethyl-7-benzofuranyl-N-methylcarbamate] N-[propynyl N-methyl carbamate] sulfide;

N-[1-(2-cyanoethylthio) acetaldehyde O-(N-methylcarbamoyl)oxime] N-[4-phenoxyphenyl N-methylcarbamate] sulfide;

N-[1-Methylthio-N',N'-dimethylcarbamoylformaldehyde O-(N-methylcarbamoyl)oxime] N-[2-(2-dithiolanyl) phenyl N-methylcarbamate] sulfide;

N-[1-(2-cyanoethylthioacetaldehyde O-[N-methylcarbamoyl)oxime] N-[2-isopropoxyphenyl N-methylcarbamate] sulfide;

N-[2-O-(N-methylcarbamoyl)oximino-1,3,5-trithiane] N-[2-isopropoxyphenyl N-methylcarbamate] sulfide;

N-[2-O-(N-methylcarbamoyl)oximino-1,3,5-trithiane] N-[2-(2-oxathiolanyl) phenyl N-methylcarbamate] sulfide;

N-[2-O-(N-methylcarbamoyl)oximino-1,4-dithiane] N-[2-propynyloxy phenyl N-methylcarbamate] sulfide;

N-[5-Methyl-4-O-(N-methylcarbamoyl)oximino-oxathiolane] N-[4-phenoxyphenyl N-methylcarbamate] sulfide:

N-[4,5,5-Trimethyl-2-O-[N-methylcarbamoyl)oximinothiazolidin-3-one] N-[2-propynyloxy phenyl N-methylcarbamate] sulfide; and N-[3,5,5-Trimethyl-2-O-[N-methylcarbamoyl]oximinothiazolidin-4-one] N-[2-(2-dithiolanyl)pheny N-methylcarbamate] sulfide, U.S. Pat. No. 4,315,928, incorporated herein by reference, discloses and claims N-aminosulfenyl carbamate compounds which are encompassed by the above formula 1 and which may be used in the method of this invention, Such N-aminosulfenyl carbamate compounds can be prepared by the methods described in U.S. Pat. No. 4,315,928, and are available from Union Carbide Agricultural Products Company, Inc., Research Triangle Park, N.C. Illustrative of the N-aminosulfenyl carbamate compounds of U.S. Pat. No. 4,315,928 which may be useful in the method of this invention include the following:

S-methyl N-[N'-methyl-N'-(diisopropylaminosulfenyl)-carbamoyloxy] thioacetimidate;

S-methyl N-[N'-methyl-N'-(di-n-butylaminosulfenyl) carbamoyloxy] thioacetimidate;

2-N-[N'-methyl-N'-(4-morpholinosulfenyl)carbamoyloxy] imino-1,4-dithiane;

S-methyl N-[N'-methyl-N'-(morpholinosulfenyl)carbamoyloxy]thioacetimidate;

S-methyl-N-[N'-methyl-N'-(4-morpholinosulfenyl)carbamoyloxy]thioacetimidate;

S-ethyl-N-[N'-methyl-N'-(4-morpholinosulfenyl)carbamoyloxy]thioacetimidate;

S-isopropyl-n'[N'-methyl-N'-(4-morpholinosulfenyl)-carbamoyloxy)thioacetimidate;

S-(2-cyanoethyl)-N-[N'-methyl-N'-(4-morpholinosulfenyl) carbamoyloxy]thioacetimidate;

S-(1-butyl)-N-[N'-methyl-N'-(4-morpholinosulfenyl)-carboxyloxy]thioacetimidate;

S-phenyl-N-[N'-methy-N'-(4-morpholinosulfenyl)carbamoyloxy]thioacetimidate;

S-(aminocarbonylmethylene)-N-[N'-methyl-N'-(4-morpholinosulfenyl)carbamoyloxy]thioacetimidate;

S-methyl-N-[N'-methyl-N'-(4-morpholinosulfenyl)carbamoyloxy]thiopropionimidate;

S-methyl-N-[N'-ethyl-N'-(4-morpholinosulfenyl)carbamoyloxy]thioacetimidate;

S-methyl-N-[N'-isopropyl-N'-(4-morpholinosulfenyl)-carbamoyloxy]thioacetimidate;

S-methyl-N-[N'-phenyl-N'-(4-morpholinosulfenyl)carbamoyloxy]thioacetimidate;

S-methyl-N-[N'-(3-chlorophenyl)-N'-(4-morpholinosulfenyl)carbamoyloxy]thioacetimidate;

S-methyl-N-[N'-methyl-N'-(4-methyl-1-piperazinosulfenyl)carbamoyloxy]thioacetimidate;

S-methyl-N-[N'-methyl-N'-(3-tetrahydro-1,3-oxazinosulfenyl)carbamoyloxy]thioacetimidate;

S-methyl-N'[N'-methyl-N'-(4-thiomorpholinosulfenyl)-carbamoyloxy]thioacetimidate;

S-methyl-N-[N'-methyl-N'-(dimethylaminosulfenyl)-carbamoyloxy]thioacetimidate;

S-methyl-N-N'-methyl-N'-(methylethylaminosulfenyl)carbamoyloxy]thioacetimidate;

S-methyl-N-[N'-methyl-N'-(methylphenylaminosulfenyl) carbamoyloxy]thioacetimidate;

S-methyl-N-[N'-methyl-N'(methylbenzylaminosulfenyl)carbamoyloxy]thioacetimidate;

S-methyl-N-[N'-methyl-N'-(ethylcyclohexylaminosulfenyl)carbamoyloxy]thioacetimidate;

S-methyl-N-[N'-methyl-N'-(methoxymethylaminosulfenyl)carbamoyloxy]thioacetimidate;

O-ethyl-N-[N'-methyl'N'-(4-morpholinosulfenyl)carbamoyloxy]acetimidate;

2-Methyl-2-(methylthio)propionaldehyde O-[N-methyl-N-(4-morpholinosulfenyl)carbamoyl]oxime;

2-methyl-2-(methylsulfonyl)propionaldehyde O-[N-methyl-N-(4-morpholinosulfenyl)carbamoyl]oxime;

2-cyano-2-methylpropionaldehyde O-[N-methyl-N-(4-morpholinosulfenyl)carbamoyl]oxime;

5-methyl-4-N-[N'-methyl-N'-(4-morpholinosulfenyl)-carbamoyloxyl]imino-1,3-oxathiolane;

2-N-[N'-methyl-N'-(4-morpholinosulfenyl)carbamoyloxy]imino-1,4-oxathiane;

2-N-[N'-methyl-N'-(4-morpholinosulfenyl)carbamoyloxy]imino-1,4-dithiane;

3,3-Dimethyl-2-N-[N'-methyl-N'-(4-morpholinosulfenyl) carbamoyloxy]imino-5-oxo-perhydro-1,4-thiazine;

5,5-Dimethyl-4-N-[N'-methyl'N'-(4-morpholinosulfenylcarbamoy)oxy]imino-1,3-dithiolane;

2-N-[N'-methyl-N'-(4-morpholinosulfenyl)carbamoyloxy]imino-3,5,5-trimethyl-1,3-thiazolidine-4-one;

S-Methyl-N-[N'-Methyl-N'-(3,3-Dimethyl-4-Morpholinosulfenyl)carbamoyloxy]thioacetimidate;

2-methyl-2-nitropropionaldehyde O-[N-methyl-N-(4-morpholinosulfenyl)carbamoyl]oxime;

N-methyl-N-(4-morpholinosulfenyl) 3-isopropylphenyl carbamate;

N-methyl-N-(4-morpholinosulfenyl) 3-sec-butylphenyl carbamate;

N-methyl-N-(4-morpholinosulfenyl) 2-isopropoxyphenyl carbamate;

N-methyl)-N-(4-morpholinosulfenyl) 4-dimethylamino-3,5-xylyl carbamate;

N-methyl-N-(4-morpholinosulfenyl) 4-dipropylamino-3,5-xylyl carbamate:

N-methyl-N-(4-morpholinosulfenyl) 4-methylthio-3,5-xylyl carbamate;

N-methyl-N-(4-morpholinosulfenyl) 4-methylthio-3tolyl carbamate;

N-methyl-N-4-morpholinosulfenyl) 2,3-dihydro-2,2-dimethyl-7-benzofuranyl carbamate;

N-methyl-N-(diisopropylamibosulfenyl) 2,3-dihydro-2,2-dimethyl-7-benzofuranyl carbamate;

N-methyl-N-(dimethylaminosulfenyl) 2,3-dihydro-2,2dimethyl-7-benzofuranyl carbamate;

N-methyl-N-(4-morpholinosulfenyl) 3-dimethylaminomethyleneaminophenyl carbamate;

N-methyl-N-(4-morpholinosulfenyl) 2-dimethylcarbamoyl-3-methyl-5-pyrazolyl carbamate;

N-methyl-N-(4-morpholinosulfenyl) 3-isopropyl-5-methylphenyl carbamate;

N-methyl-N-(4-morpholinesulfenyl) 4-methoxy-3,5-xylyl carbamate;

N-methyl-N-(4-morpholinosulfenyl) 2-methoxy-4-methylphenyl carbamate;

N-methyl-N-(4-morpholinosulfenyl)2-chloro-4-methylphenyl carbamate;

N-methyl-N-(di-n-butylaminosulfenyl) 3-sec-amylphenyl carbamate:

N-methyl-N-(4-morpholinosulfenyl) 5,6-dimethyl5,6,7,8-tetrahydro 1-naphthyl-carbamate;
2-N-[N'-methyl-N'-(4-morpholinosulfenyl)carbamoyloxy]- imino-1,3-dithiolane;
Propiophenone O-[N-methyl-N-(4-morpholinosulfenyl)carbamoyl]oxime:
O-[N-methyl-N-(4-morpholinosulfenyl)carbamoyl]-phenylglyoxylonitrileoxime;
1-chloro-1-(ethylthio)formaldehyde O-[N-methyl-N-(4-morpholinosulfenyl)carbamoyl]oxime;
S-[2-(N-methylcarbamoyloxy)ethyl]-N-[N'-methyl-N'-(4-morpholinosulfenyl)carbamoyloxy]thiopropionimidate;
S-Methyl-1-dimethylcarbamoyl-N-[N'-methyl-N'-(4-morpholinosulfenyl)carbamoyloxy]thioformimidate:
O-Methyl-1-dimethylcarbamoyl-N-[N'-methyl-N'-(4-morpholinosulfenyl)carbamoyloxy]formimidate:
3,3-dimethyl-1-(methylthio)-2-butanone O-[N-methyl-N-(4-morpholinosulfenyl)carbamoyl]oxime:
Alpha(methylcarbamoyloxy)acetophenone O-[N-methyl-N-(4morpholinesulfenyl)carbamoyl]oxime;
Methyl 2-Methylpropenyl ketone O-[N-methyl-N-(4morpholinesulfenyl)carbamoyl]oxime;
Alpha(methylsulfinyl)acetonphenone O-[N-methyl-N-(4-morpholinosulfenyl)carbamoyl]oxime;
Exo-3-chloro-endo-6-cyano-2-norbornanone O-[N-methyl-N-(4-morpholinosulfenyl)carbamoyl]oxime;
S-isopropyl-1-acetyl-N-[N'-methyl-N'(4-morpholinosulfenyl)carbamoyloxy]thioformimidate:
5,5-dimethyl-1,4-dithia-6-N-[N'-methyl-N'-(4-morpholinosulfenyl)carbamoyloxy]-iminocycloheptane;
2,4-dimethyl-1,3-dithiolane-2-carboxaldehyde O-[N-methyl-N-(4morpholinosulfenyl)carbamoyl)oxime;
Isopropyl 5-(methylthio)-2-thienyl ketone O-[N-methyl N-(4-morpholinosulfenyl)carbamoyl]oxime;
2,2-dimethyl-3-hydroxypropionaldehyde O-[N-methyl-N-(4-morpholinosulfenyl)carbamoyl]oxime;
2,2-dimethyl-3-(methylsulfonyloxy)propionaldehyde O-[N-methyl-N-(4-morpholinosulfenyl)carbamoyl-]oxime;
3,3-dimethyl-4-N-[N-methyl-N-(4-morpholinosulfenyl)-carbamolyoxy]imino-tetrahydrothiophene;
S-methyl-N-[N'-methoxymethyl-N'-(4-morpholinosulfenyl)carbamoyloxy)thioacetimidate;
S-methyl N-[N'-allyl-N'-(4-morpholinosulfenyl)carbamoyloxy]thioacetimidate;
S-methyl N-[N'-(2-chloroethyl)-N'-(4-morpholinosulfenyl)carbamoyloxy]thioacetimidate;
S-methyl-N-[N'cyanomethyl-N'-(4-morpholinosulfenyl)carbamoyloxy]thioacetimidate;
S-methyl N-[N'-benzyl-N'-(4-morpholinosulfenyl)carbamoyloxy]thioacetimidate;
S-methyl N-[N'methoxy-N'-(4-morpholinosulfenyl)carbamoyloxy]thioacetimidate;
S-methyl N-[N'-(2-furylmethyl)-N'-(4-morpholinosulfenyl)carbamoyloxy]thioacetimidate;
S-methyl N-[N'-(1-acetyl-3-piperidylmethyl)-N'-(4-morpholinosulfenyl)carbamoyloxy]thioacetimidate;
S-methyl N-[N'-(3-tetrahydrothiophenylmethyl)-N'-(4-morpholinosulfenyl)carbamoyloxy]thioacetimidate;
S-methyl N-[N'-cyclohexyl-N'-(4-morpholinosulfenyl)-carbamoyloxy]thioacetimidate;
S-methyl N-[N'-(4-nitrophenyl)-N'-(4-morpholinosulfenyl)carbamoyloxy]thioacetimidate;
S-methyl N-[N'-(4-methoxyphenyl)-N'-(4-morpholinosulfenyl)carbamoyloxy]thioacetimidate; and
S-methyl N-[N'-(2-chloro-4-methylphenyl)-N'-(4-morpholinosulfenyl)carbamoyloxy]thioacetimidate.

U.S. Pat. No. 4,072,751, incorporated herein by reference, discloses and claims N-substituted bis-carbamoyl sulfide compounds which are encompassed by the above formula 1 and which may be used in the method of this invention, Such N-substituted bis-carbamoyl sulfide compounds can be prepared by the methods described in U.S. Pat. No. 4,072,751, and are available from Union Carbide Agricultural Products Company, Inc., Research Triangle Park, N.C. Illustrative of the N-substituted bis-carbamoyl sulfide compounds of U.S. Pat. No. 4,072,751 which may be useful in the method of this invention include the following:
1-Methylsulfinyl-[N-methyl-N-(N'-methyl-N'-fluorocarbonylaminosulfenyl)carbamoyloxy]acetimidate;
S-Methyl-N-[N'[N''-(1-methysulfinylethylidiniminooxycarbonyl)-N''-methylaminosulfenyl]-N'-methylcarbamoyloxy]thioacetimidate;
S-Methyl-N-[N'-[N''-(1-methylsulfonylthylidiniminooxycarbonyl)-N''-methylaminosulfenyl]-N'methylcarbamoyloxy]thioacetimidate;
1-Methyl-N-[(N'-[N''-(1-methylsulfinylthylidiniminooxycarbonyl)-N''-methylaminosulfenyl]-N'-methylcarbamoyloxy]-sulfinylacetimidate;
1-Methylsulfonyl-N-[N'-N''-(1-methylsulfonylthylidiniminooxycarbonyl)N''-methylaminosulfenyl]N'metylcarbamoyloxy]acetimidate;
1-Isopropylsulfinyl-[N-methyl-N-(N'-methyl-N'-fluorocarbonylaminosulfenyl)carbamoyloxy]acetimidate;
1-Pentylsulfonyl-[N-methyl-N-(N'-methyl-N'-fluorocarbonyaminosulfenyl)carbamoyloxy]acetimidate;
S-Isopropyl-N-[N'-[N''-(1-methylsulfinylethylidiniminooxycarbonyl)-N''-methylaminosulfenyl]-N'-methylcarbamoyloxy[thioacetimidate;
S-Isopropyl-N-[N'-[N''-(1-isopropylsulfinylethylidiniminooxycarbonyl)-N''-methylaminosulfenyl]-N'-methylcarbamoyloxy] thioacetimidate;
S-Isopropyl-N-[N'-[N''-(1-isopropylsulfonylethylidiniminooxycarbonyl)-N'-methylaminosulfenyl]-N'-methylcarbamoyloxy] thioacetimidate;
1-Isopropylsulfonyl-[N-methyl-N-(N'-methyl-N'-fluorocarbonylaminosulfenyl)carbamoyloxy] acetimidate; and
1-Butylsulfinyl-[N-methyl-N-(N'-methyl-N'-fluorocarbonylaminosulfenyl)carbamoyloxy] acetimidate.

U.S. Pat. Nos. 4,486,477 and 4,400,389, incorporated herein by reference, disclose and claim symmetrical bis-sulfenylated bis-carbamate compounds which are encompassed by the above formula 1 and which may be used in the method of this invention, Such symmetrical bis-sulfenylated bis-carbamate compounds can be prepared by the methods described in U.S. Pat. Nos. 4,486,447 and 4,400,389, and are available from Union Carbide Agricultural Products Company, Inc., Research Triangle Park, N.C. Illustrative of the symmetrical bis-sulfenylated bis-carbamate compounds of U.S. Pat. Nos. 4,486,447 and 4,400,389 which may be useful in the method of this invention include the following:
1,2-Bis-[[N-methyl-N-[N'-(1-ethylthioethylideneiminooxycarbonyl N-methylaminosulfenyl]carbamoyloxy]ethane;
2,2'-Bis-[[N-methyl-N-[N'-(1-isopropylthioethylideneiminooxycarbonyl)-N'-methylaminosulfenyl]carbamoyloxy]]diethyl ether;

1,6-Bis-[[N-methyl-N-[N'-(1-butylthioethylideneiminooxycarbonyl)-N'-methylaminosulfenyl]carbamoyloxy]]hexane;
4,4'-Bis-[[N-methyl-N-[N'(2-methyl-2-methylthiopropylideneiminooxycarbonyl)-N'-methylaminosulfenyl]carbamoyloxy]]biphenyl;
4,4'-Bis-[[N-methyl-N-[N'-(2-methyl-2-methylsulfonylpropylideneiminooxycarbonyl)-N'-methylaminosulfenyl]carbamoyloxy]]diphenyl sulfide;
1,2-Bis-[[N-methyl-N-[N'-(2-methylsulfonylpropylideneiminooxycarbonyl)-N'-methylaminosulfenyl]carbamoyloxy]]benzene;
1,2-Bis-[[N-methyl-N-[N'-(1,3-dithiane-2-ylideneiminooxycarbonyl)-N'-methylaminosulfenyl]-carbamoyloxy]]
1,2-Bis-[[N-methyl-N-[N'-(1,3-dithiolane-2-ylideneiminooxycarbonyl)-N'-methylaminosulfenyl]-carbamoyloxy]]ethane;
2,2'-Bis-[[N-methyl-N-[N'-(thiophane-2-ylideneiminooxycarbonyl)-N'-methylaminosulfenyl]-carbamoyloxy]]diethy ether;
1,6-Bis[[N-methyl-N-[N'(thiophane-3-ylideneimioxycarbonyl)-N'-methylaminosulfenyl]carbamoyloxy]]-hexane;
1,4-Bis-[[N-methyl-N-[N'-(3,3-dimethyl-1,4-dioxane-2-ylideneiminooxycarbonyl)-N'-methylaminosulfenyl]-carbamoyloxy]]2-butene;
1,2-Bis-[[N-methyl-N-[N'-(4-methyl-1,4-thiazine-3-one-2-ylideneiminooxycarbonyl)-N'-methylaminosulfenyl]carbamoyloxy]ethane;
1,2-Bis-[[N-methyl-N-[N'-(4-methyl-1,4-oxazine-3-one-2-ylideneiminooxycarbonyl)-N'-methylaminosulfenyl]carbamoyloxy]]ethane;
1,2-Bis-[[N-methyl-N-[N'-(3,3-dimethyl-1,4-thiazine-5-one-2-ylideneiminooxycarbonyl)-N'-methylaminosulfenyl]carbamoyloxy]]ethane;
1,2-Bis-[[N-methyl-N-[N'-(1,3,5-trithiane-2-ylideneiminooxycarbonyl)-N'-methylaminosulfenyl]-carbamoyloxy]]ethane;
1,2-Bis[[N-methyl-N-[N'-(1,3,5-oxadithiane-4-ylideneiminooxycarbonyl)-N'-methylaminosulfenyl]-carbamoyloxy]]ethane:
2,2'-bis-[[Bis-[[N-methyl-N-[N-40-(2-methylimino,5,5-dimethyl-4-ylideneiminooxycarbonyl)-N'-methylaminosulfenyl]carbamoyloxy]diethyl]]ether;
2,2'-Bis-[[N-methyl-N-[N'-(1,4-oxathiane-2-ylideneiminooxycarbonyl)-N'-methylaminosulfenyl]-carbamoyloxy]diethyl sulfide;
2,2'-Bis-[[N-methyl-N-[N'-(4,5,5-trimethyl-thiazolidin-3-one-2-ylideneiminooxycarbonyl)-N'-methylaminosulfenyl]carbamoyloxy]]diethyl sulfide;
1,2-Bis-[[N-methyl-N-[N'-(3,5,5-trimethyl-thiazolidin-4-one-2-ylideneiminooxycarbonyl)-N'-methylaminosulfenyl]carbamoyloxy]]ethane;
2-Bis-[[N-butyl-N-[N'-(1-methylthioethylideneiminooxycarbonyl)-N'-butylaminosulfenyl]carbamoyloxy]]ethane;
1,2-Bis[[N-methyl-N-[N'-(3,3-dimethyl-1-methylthio-2-butylidene iminooxycarbonyl)-N'-methylaminosulfenyl]carbamoyloxy]ethane;
2,2-Diphenyl-4,4'-bis[[N-butyl-N-[N'-(1,4-dithiane-4-oxide-2-ylideneiminooxycarbonyl)-N'-butylaminosulfenyl]carbamoyloxy]]propane;
2,2'-Bis-[[N-methyl-N-[N'-(5,5-dimethyl-1,3-dithiolane-4-ylideneiminooxycarbonyl)-N'-methylaminosulfenyl]carbamoyloxy]]diethylsulfone;
2,2'-Bis-[[N-methyl-N-[N'-(5-methyl-1,3-oxathiolane-4-ylideneiminooxycarbonyl)-N'-methylaminosulfenyl]-carbamoyloxy]]diethyl ether;
1,2-Bis-[[N-methyl-N-[N'-(3,5-diisopropylphenyloxycarbonyl)-N'-methylaminosulfenyl]carbamoyloxy]]ethane;
6-Bis[[N-methyl-N-[N'-(2-isopropoxyphenyloxycarbonyl-N'-methylaminosulfenyl]carbamoyloxy]]hexane;
2,2'-Bis[[N-methyl-N-[N'-(3,5-dimethyl-4-methylthiophenyloxycarbonyl)-N'-methylaminosulfenyl]carbamoyloxy]diethyl ether;
1,2-Bis-[[N-methyl-N-[N'-(1-naphthyloxycarbonyl)-N'methylaminosulfenyl]carbamoyloxy]]ethane;
1,2-Bis-[[N-methyl-N-[N'-4-(2,2-dimethylbenzodioxanyloxycarbonyl)-N'-methylaminosulfenyl]carbamoyloxy]]ethane;
2,2'-Bis-[[N-methyl-N-[N'-(3,5-dimethyl-4-dimethylaminophenyloxycarbonyl)-N'-methylaminosulfenyl]carbamoyloxy]]diethyl ether;
1,2-Bis-[[N-methyl-N-[N'-(3-isopropyl-4-dimethylaminomethyleneiminophenyloxycarbonyl)-N'-methylaminosulfenyl]carbamoyloxy]]ethane, dihydrochloride;
4,4'-Bis-[[N-methyl-N-[N'-(2-ethylthiomethylphenyloxycarbonyl)-N'-methylaminosulfenyl]carbamoyloxy]]-diphenyl ether;
4,4'-Bis-[[N-methyl-N-[N'-2-chlorophenyloxycarbonyl)-N'-methylaminosulfenyl]carbamoyloxy]]-diphenyl sulfide;
1,4-Bis-[[N-methyl-N-[N'-7-(2,3-dihydro-2-methylbenzofuranoxycarbonyl)-N'-methylaminosulfenyl]carbamoyloxy]]-2-butyne;
1,4-Bis-[[N-methyl-N-(2-propynyloxyphenyloxycarbonyl)-N'-methylaminosulfenyl]carbamoyloxy]]-2-butene;
1,2-Bis-[[N-methyl-N-[N'-(1-(2-cyanoethylthio)ethylideneiminooxycarbonyl)-N'-methylaminosulfenyl]carbamoyloxy]]ethane;
1,2-Bis-[[N-methyl-N-[N'-(2-cyano-2-methylpropylideneiminooxycarbonyl)-N'-methylaminosulfenyl]carbamoyloxy]]benzene;
1,2-Bis-[[N-methyl-N-[N'-(2-methyl-2-nitropropylideneminosulfenyl]carbamoyloxy]ethane;
1,2-Bis-[[N-methyl-N-[N'-(3,3-dimethyl-1-methylsulfinyl2-butylideneiminooxycarbonyl)-N'-methylaminosulfenyl]carbamoyloxy]ethane; and
1,2-Bis-[[N-methyl-N-[N'-(1-dimethylaminocarbonyl-1-methylthiomethylideneiminooxycarbonyl)-N'-methylaminosulfenyl]carbamoyloxy]]ethane.

U.S. Pat. Nos. 4,327,110 and 4,413,007, incorporated herein by reference, disclose and claim symmetrical N-substituted bis-carbamoyloximino disulfide compounds which are encompassed by the above formula 1 and which may be used in the method of this invention, Such symmetrical N-substituted bis-carbamoyloximino disulfide compounds can be prepared by the methods described in U.S. Pat. Nos. 4,327,110 and 4,413,007, and are available from Union Carbide Agricultural Products Company, Inc., Research Triangle Park, N.C. Illustrative of the symmetrical N-substituted bis-carbamoyloximino disulfide compounds of U.S. Pat. Nos, 4,327,110 and 4,413,007 which may be useful in the method of this invention include the following:

N-N'-bis-[1-Methylthioacetaldehyde O-(N-methylcarbamoyl)oxime]disulfide;

N,N'-bis-[1-Isopropylthioacetaldehyde O-(N-methylcarbamoyl)oxime]disulfide;

N,N'-bis-[1-(2-Cyanoethylthio)acetaldehyde O-(N-methylcarbamoyl)oxime]disulfide;

N,N'-bis[5-Methyl-4-(O-(N-methylcarbamoyl)oximino)-1,3-oxathiolane]disulfide;

N,N'-bis-[2-(O-(N-Methylcarbamoyl)-1,4-dithiane]disulfide;

N,N'-bis-[4-(O-(N-Methylcarbamoyl)oximino)-1,3-dithiolane]disulfide;

N,N'-bis-[5,5-Dimethyl-4-(O-(N-methylcarbamoyl)oximino)-1,3-dithiolane]disulfide;

N,N'-bis-[3,5,5-Trimethyl-2-(O-(N-methylcarbamoyl-)oximino)-thiazolidin-4-one]disulfide;

N,N'-bis-[4,5,5-Trimethyl-2-(O-(N-methylcarbamoyl)oximino)-thiazolidin-3-one]disulfide;

N,N'-bis-[2-(O-(N-Methylcarbamoyl)oximino)-1,3-dithiolane]disulfide;

N,N'-bis-[2-Cyano-2-methylpropionaldehyde O-(N-methylcarbamoyl)oxime]disulfide;

N,N'-bis-[1-Methylthio-N'',N''-dimethylcarbamoylformaldehyde O-(N-methylcarbamoyl)oxime]disulfide;

N,N'-bis-[4-Methyl-2-(O-(N-methylcarbamoyl)oximino)tetrahydro-1,4-thiazin-3-one]disulfide;

N,N'-bis-[3,3-Dimethyl-1-methylthiobutanone-2 O-(N-methylcarbamoyl)oxime]disulfide;

N,N'-bis-[3-Methylsulfonylbutanone-2 O-(N-methylcarbamoyl)oxime]disulfide;

N,N'-bis-[2-Methylsulfonyl-2-methylpropionaldehyde-O-(N-methylcarbamoyl)oxime]disulfide:

N,N'-bis-[1-Methylthiopyruvaldehyde O-(N-methylcarbamoyl)oxime)disulfide;

N,N'-bis-[3,3-Dimethyl-1-methylsulfonylbutanone-2-O-(N-methylcarbamoyl)oxime]disulfide:

N,N'-bis-1-[N-(Dimethylaminomethylene)carbamoyl-1-methylthioformaldehyde O-(N-methylcarbamoyl)oxime]disulfide:

N,N'-bis-[1-Methylthio-1-ethoxycarbonylformaldehyde-O-(N-methylcarbamoyl)oxime]disulfide;

N,N'-bis-[1,3,5-Oxadithiane-4 O-(N-methylcarbamoyloximino)]disulfide;

N,N'-bis-[(O-(N-Methylcarbamoyl)oximino-1,4-oxathiane]disulfide;

N,N'-bis-[1-Cyano-2,2-dimethylpropionaldehyde O-(N-methylcarbamoyl)oxime]disulfide N,N'-bis-[4-Methyl-2-(O-(N-methylcarbamoyl)oximino)tetrahydro-1,4-thiazin-5-one]disulfide;

N,N'-bis-[1-Methylthloacetaldehyde O-(N-butylcarbamoyl)oxlme]disulfide; and

N,N'-bis-[1,3,5-Trithiane-2 O-(N-methylcarbamoyl)oximino]disulfide,

Other sulfur-containing compounds disclosed in the art and encompassed within the formula 1 may also be used in the method of this invention, Such sulfenylated compounds including the preparation thereof are described in the following U.S. Pat. Nos.: 4,208 409; 4,444,786; 4,413,005: 4,298,617; 4,315,027; 4,410,518; 4,006,231; 4,342,778; 1 3,847,951; 4,103,024; 4,113,876; 4,148,910; 4,008,328; 4,511,578; 4,424,213; 4,225,615; 4,268,520: and 4,160,034.

Illustrative of these other sulfur-containing compounds which may be useful in the method of this invention include the following:

7-[N-methyl-N-[N'-methyl-N'[butoxycarbonyl-]aminosulfenyl]carbamoyloxy]-2,3-dihydro-2,2-dimethylbenzofuran (furathiocarb);

Methyl N-methyl-N-[N'-tert-butyl-N'-[5,5-dimethyl-2-thioxo-1,3,2-dioxaphosphorinan-2-yl]aminosulfenyl]-carbamoyloxy]ethanimidothioate;

Methyl N-[[[[[(5,5-dimethyl-2-thioxo-1,3,2-dioxaphosphorinan-2-yl)lsopropylamino]thio]methylamino]-carbonyl]oxy]ethanimidothioate;

Methyl N-[[[[[(5,5dimethyl-2-thioxo-1,3,2dioxphosphorian-2-yl)tert-butylamino]thio]methylamino]carbonyl]oxy]ethanimidothioate;

Methyl N-[[[[[isopropyl(5,5-diethyl-2-thioxo-1,3,2-phosphorinan-2-yl)amino]thio]amino ]carbonyl]oxy]ethanimidothioate;

Methyl N-[[[[[ethyl(5,5-dimethyl-2-thioxo-1,3,2-dioxaphosphorinan-2-yl)amino]thio]amino]carbonyl]oxy]ethanimidothioate;

Methyl N-[[[[[isopropyl(2-thioxo-1,3,2-phospholan-2-yl)amino]thio]methylamino]carbonyl]oxy]ethanimidothioate;

Methyl N-[[[[[isopropyl(2-thioxo-1,3,2-dioxaphosphorinan-2-yl)amino]thio]methylamino]carbonyl]oxy]ethanimidothioate;

Methyl N-[[[[[isopropyl(4,4,6-trimethyl-2-thioxo-1,3,2-dioxaphosphorinan-2-yl)amino]thio]methylamino]-carbonyl]oxy]ethanimidothioate;

Methyl N-[[[[[cyclohexyl(5,5-diethyl-2-thioxo-1,3,2-dioxaphosphorinan-2-yl)amino]thio]methylamino]-carbonyl]oxy]ethanimidothioate;

Methyl N-[[[[[cyclohexyl(5,5-dimethyl-2-thioxo-1,3,2-dioxaphosphorinan-2-yl)amino]thio]methylamino]-carbonyl]oxy]ethanimidothioate;

Methyl N-[[[[[methyl(2-thioxo-1,3,2-dioxaphosphorinan-2-yl)amino]thio]methylamino]carbonyl]oxy]ethanimidothioate;

S-Methyl N-[(N-Methyl-N-(N-methyl-N-ethoxycarbonylmethylaminosulfenyl)carbamoyl)oxy]thioacetamidate;

S-Methyl N-[(N-Methyl-N-(N-n-butyl-N-methoxycarbonylmethylaminosulfenyl)carbamoyl)oxy]thioacetamidate;

S-Methyl N-[(N-Methyl-N-(N-phenyl-N-ethoxycarbonylmethylaminosulfenyl)carbamoyl)oxy]thioacetamidate;

S-Methyl N-[(N-methyl-N-(N-phenyl-N-ethoxycarbonylmethylaminosulfenyl)carbamoyl)oxy]thioacetamidate;

S-Methyl N-[(N-Methyl-N-(N-benzoyl-N-ethoxycarbonylmethylaminosulfenyl)carbamoyl)oxy]thioacetamidate;

S-Methyl N-[(N-Methyl-N-(N-n-propyl-N-ethoxycarbonylethylaminosulfenyl)carbamoyl)oxy]thioacetamidate;

S-Methyl N-[(N-Methyl-N-(N-isopropyl-N-ethoxycarbonylethylaminosulfenyl)carbamoyl)oxy]thioacetamidate;

S-Methyl N-[(N-Methyl-N-(N-isopropyl-N-ethoxycarbonylethylaminosulfenyl)carbamoyl)oxy]thioacetamidate;

S-Methyl N-[(N-Methyl-N-(N-ethoxycarbonyl-N-ethoxycarbonylethylaminosulfenyl)carbamoyl)oxy]-thioacetamidate;

S-Methyl N-[(N-Methyl-N-(N,N-bis(ethoxycarbonylmethyl)aminosulfenyl)carbamoyl)oxy]thioacetamidate;

S-Methyl N-[(N-Methyl-N-(N,N-bis(ethoxycarbonylethyl)aminosulfenyl)carbamoyl)oxy]thioacetamidate;

2,3-Dihydro-2,2-dimethylbenzofuran-7-yl N-[N,N-bis-(ethoxycarbonylmethyl)aminosulfenyl]-N-methylcarbamate;

2,3-Dihydro-2,2-dimethylbenzofuran-7-yl N-(N-methyl-N-ethoxycarbonylmethylaminosulfenyl)-N-methylcarbamate;

2,3-Dihydro-2,2-dimethylbenzofuran-7-yl N-(N-isopropyl-N-ethoxycarbonylethylaminosulfenyl)-N-methylcarbamate;

2,3-Dihydro-2,2-dimethylbenzofuran-7-yl N-(N-n-butyl-N-ethoxycarbonylethylaminosulfenyl)-N-methylcarbamate;

2,3-Dihydro-2,2-dimethylbenzofuran-7-yl N-(N-cyclohexyl-N-ethoxycarbonylethylaminosulfenyl)-N-methylcarbamate;

2,3-Dihydro-2,2-dimethylbenzofuran-7-yl N-(N-n-butyl-N-cyanoethylaminosulfenyl)-N-methylcarbamate;

2,3-Dihydro-2,2-dimethylbenzofuranyl-7 N-[(N'-isopropoxycarbonyl)-N'-(methylaminosulfinyl)]-N-methylcarbamate;

2,3-Dihydro-2,2-dimethylbenzofuranyl-7 N-[N'-(methoxycarbonyl)-N'-(methylaminosulfinyl)]-N-methylcarbamate;

2,3-Dihydro-2,2-dimethylbenzofuranyl-7 N-[N'-(methoxycarbonyl)-N'-(methylaminosulfinyl)]-N-methylcarbamate;

2,3-Dihydro-2,2-dimethylbenzofuranyl-7 N[N'-(n-propoxycarbonyl)-N'-(methylaminosulfinyl)]-N-methylcarbamate;

2,3-Dihydro-2,2-dimethylbenzofuranyl-7 N-[N'-(n-heptoxycarbonyl)-N'-(methylaminosulfinyl)]-N-methylcarbamate;

N,N'-sulfinyldi-[S-methyl N''-(methylcarbamoyloxy)-thioacetimidate];

N'-sulfinyldi-[2-methyl-2-(methylthio)propionaldhyde O-methylcarbamoyloxime];

N,N'-sulfinyldi-[S-methyl N'',N''-dimethyl-N'''-methylcarbamoyloxy-1-thio-oximidate];

N,N'-sulfinyldi-[3,3-dimethyl-1-(methylthio)butanone O-methylcarbamoyloxime];

2,3-Dihydro-2,2-dimethyl-7-benzofuranyl[[[(diethoxyphosphinothioyl)methylamino]sulfinyl]methylcarbamate;

2,3-Dihydro-2,2-dimethyl-7-benzofuranyl[[[(diethoxyphosphinothioyl)hexylamino]sulfinyl]methylcarbamate;

Methyl N-[[[[[(dimethoxyphosphinothioyl)methylamino]sulfinyl]methylamino]carbonyl]oxy]ethanimidothioate;

Methyl N-[[[[[(diethoxyphosphinothioyl)ethylamino]-sulfinyl]methylamino]carbonyl]oxy]ethanimidothioate;

Methyl N-[[[[[(diethoxyphosphinothioyl)hexylamino]-sulfinyl]methylamino]carbonyl]oxy]ethanimidothioate;

Methyl N-[[[[[(diethoxyphinothioyl)isopropylamino]-sulfinyl]methylamino]carbonyl]oxy]ethanimidothioate;

2,3-Dihydro-2,2-dimethyl-7-benzofuranyl[[(5,5-dimethyl-2-thioxo-1,3,2-dioxaphosphorinan-2-yl)methylamino]sulfinyl]methylcarbamate;

Methyl N-[[[[[(5,5-dimethyl-2-thioxo 1,3,2-dioxaphosphorinan-2-yl)(methyl)amino]sulfinyl]methylamino]-carbonyl]oxy]ethanimidothioate;

2,3-Dihydro-2,2-dimethyl-7-benzofuranyl(dimethylaminosulfenyl)(methyl)carbamate;

2,3-Dihydro-2,2-dimethyl-7-benzofuranyl (methyl)-(morpholinosulfenyl)carbamate;

2,3-Dihydro-2,2-dimethyl-7-benzofuranyl (methyl)-(piperidinosulfenyl)carbamate;

N-methyl-N-methylthio-2,3-dihydro-7-benzofuranyl carbamate;

N-methyl-N-methylthio-2,3-dihydro-7-benzofuranyl carbamate;

N-methyl-N-methylthio-2,3-dihydro-2,2-dimethyl-7-benzofuranyl carbamate;

N-methyl-N-ethylthio-2,3-dihydro-2,2-dimethyl-7-benzofuranyl carbamate;

N-methyl-N-propylthio-2,3-dihydro-2,2-dimethyl-7-benzofuranyl carbamate;

N-isobutylthio-2,3-dihydro-2,2-dimethyl-7-benzofuranyl carbamate;

N-ethyl-N-butylthio-2,3-dihydro-2,2-diethyl-7-benzofuranyl carbamate;

N-methyl-N-hexylthio-2,3-dihydro-2,2-dimethyl-7-benzofuranyl carbamate;

N-methyl-N-decylthio-2,3-dihydro-2,2-dimethyl-7-benzofuranyl carbamate;

N-methyl-N-dodecylthio-2,3-dihydro-2,2-dimethyl-7-benzofuranyl carbamate;

N-butyl-N-vinylthio-2,3-dihydro-2-methyl-2-ethyl-7-benzofuranyl carbamate;

N-butyl-N-propenylthio-2,3-dihydro-2,2-dipropyl-7-benzofuranyl carbamate;

N-propyl-N-2-butenylthio-2,3-dihydro-2,2-dibutyl-7-benzofuranyl carbamate;

N-methyl-N-3-heptenylthio-2,3-dihydro-2,2-dimethyl-7-benzofuranyl carbamate;

N-2-bromoethylthio-2,3-dihydro-2,2-dimethyl-7-benzofuranyl carbamate;

N-methyl-N-2,2-dichloroethylthio-2,3-dihydro-7-benzofuranyl carbamate;

N-methyl-N-2,2,2-trifluoroethylthio-2,3-dihydro-2,2-dimethyl-7-benzofuranyl carbamate;

N-methyl-N-2,2,2-trichloroethylthio-2,3-dihydro-2,2-dimethyl-7-benzofuranyl carbamate;

N-methyl-N-1,2,2-tribromoethylthio-2,3-dihydro-2,2-dimethyl-7-benzofuranyl carbamate;

N-methyl-N-1,2-difluoroethylthio-2,3-dihydro-2,2-dimethyl-7-benzofuranyl carbamate;

N-methyl-N-2-bromoethylthio-2,3-dihydro-2,2-dimethyl-7-benzofuranyl carbamate;

N-methyl-N-1,2,2,2-tetrachloroethylthio-2,3-dihydro-2,2-dimethyl-7-benzofuranyl carbamate;

N-methyl-N-1,1,2,2-tetrachloroethylthio-2,3-dihydro-2,2-dimethyl-7-benzofuranyl carbamate;

N-methyl-N-3,6-dibromohexylthio-2,3-dihydro-2,2-dimethyl-7-benzofuranyl carbamate;

N-methyl-N-trichlorovinylthio-2,3-dihydro-2,2-dimethyl-7-benzofuranyl carbamate;

N-tribromovinylthio-2,3-dihydro-2,2-dimethyl-7-benzofuranyl carbamate;

N-alpha -naphthylthio-2,3-dihydro-2,2-dimethylbenzofuranylcarbamate;

N-methyl-N-phenylthio-2,3-dihydro-7-benzofuranyl carbamate;

N-methyl-N-phenylthio-2,3-dihydro-2-methyl-7-benzofuranyl carbamate;

N-methyl-N-phenylthio-2,3-dihydro-2,2-dimethyl-7-benzofuranyl carbamate;

N-methyl-N-4-chlorophenylthio-2,3-dihydro-2,2-dimethyl-7-benzofuranyl carbamate;

N-methyl-N-4-fluorophenylthio-2,3-dihydro-2,2-dimethyl-7-benzofuranyl carbamate;

N-methyl-N-3,5-dichlorophenylthio-2,3-dihydro-2,2-dimethyl-7-benzofuranyl carbamate;

N-methyl-N-2,4-dichlorophenylthio-2,3-dihydro-2,2-dimethyl-7-benzofuranyl carbamate;

N-methyl-N-3-chloro-5-methylphenylthio-2,3-dihydro-2-methyl-7-benzofuranyl carbamate;

N-ethyl-N-2-bromophenylthio-2,3-dihydro-2,2-dimethyl-7-benzofuranyl carbamate;
N-methyl-N-4-methylphenylthio-2,3-dihyro-7-benzofuranyl carbamate;
N-4-chlorophenylthio-2,3-dihydro-2-methyl-7-benzofuranyl carbamate;
N-methyl-N-4-ethylthiophenylthio-2,3-dihydro-2,2-dimethyl-7-benzofuranyl carbamate;
N-methyl-N-o-nitrophenylthio-2,3-dihydro-2,2-7-benzofuranyl carbamate;
N-methyl-N-o-nitrophenyl-2,3-dihydro-2,2-dimethyl-7-benzofuranyl carbamate;
N-methyl-p-nitrophenylthio-2,3-dihydro-2,2-dimethyl-7-benzofuranyl carbamate;
N-Methyl-N-(2-toluenesulphonic acid methylamide-N'-sulphenyl)-2,2-dimethyl-2,3-dihydrobenzofuranyl-(7)-carbamate;
(3-Trifluoromethyl-benzenesulfonic acid-N'-methylamido-N'-sulfenyl)-N-methyl-carbamic acid ester of 2-(1',3'-dioxolan(2')yl)-phenol;
(2-Nitro-benzenesulfonic acid-N'-methylamido-N'-sulfenyl)-N-methyl-carbamic acid ester of 2,2-dimethyl-2,3-dihydro-7-hydroxybenzofuran;
N-methyl-N-(3-trifluoromethylphenylsulfenyl)-1-methylthioacetaldoxime-carbamate;
1,3-thiolane-2-oximino-carbamate;
N-methyl-N-(3-trifluoromethylpheny]sulfenyl);
N-methyl-N-(3-trifluoromethylphenylsulfenyl)-2-methyl-2-methylthiopropionaldoxime-carbamate;
N-methyl-N-(3-trifluoromethylphenylsulfenyl)-1-methylthioglyoxylic acid dimethylamide oximecarbamate; and
Isobutyryl-N-methylamidosulfenyl-N'-methyl-[2,2-dimethyl-2,3-dihydrobenzofuranyl(7)]carbamate.

It is appreciated that the particular sulfur-containing compounds listed hereinabove are illustrative of sulfur-containing compounds which may be used in the method of this invention. The method of this invention is not to be construed as being limited only to the use of these sulfur-containing compounds; but rather, the method of this invention includes those sulfur-containing compounds encompassed within formula 1 hereinabove.

The sulfur-containing compounds of formula 1 are effective in the protection of developing plants against attack by plant parasitic nematodes. These sulfur-containing compounds are particularly useful on nematode pests of agricultural crops such as soybeans, corn, cotton, wheat, rice, vegetables, bearing and non-bearing fruit, and ornamentals. The sulfur-containing compounds are effective against a wide range of nematode pests including species of Meloidogyne, Heterodera, Globodera, Rotylenchulus, Pratylenchus, Aphelenchoides, Helicotylenchus, Hoplolaimus, Paratrichodorus and Tylenchorhynchus. Because of systemic activity possessed by many of the sulfur-containing compounds of formula 1 these compounds are effective not only against a wide variety of soil nematodes but also against stem, bulb and foliar nematodes and other pests by practicing the method of this invention.

The residual activity in agricultural soil is relatively short for certain of the sulfur-containing compounds of formula 1, e,g.. thiodicarb. and if applied to the soil at the time of or prior to planting, these compounds may not remain active for a sufficient period of time to provide optimum protection of developing plants from attack by plant parasitic nematodes. However, because of the nematicidal properties of these sulfur-containing compounds and because many of these compounds exhibit no or minimal phytotoxicity to most plant species and are systemic, application of these compounds to seeds, seed pieces and bare root systems allows for protection of plants, especially seedlings or young plants, from attack by nematodes. The most critical phenological stage of many agricultural crop species is during seedling establishment. Early season protection against stress factors including parasitism by nematodes is important in the overall yield and quality capacity of the plant. This invention provides an effective method for utilizing such short residual systemic compounds as nematicides for crop protection.

The sulfur-containing compounds of formula 1 may be applied to seed, seed pieces, or roots of plants by conventional methods known in the art. Such methods include, but are not limited to, seed coating or dusting, root or seed piece dips, sprays, or coatings.

Formulated compositions containing a sulfur-containing compound as the active ingredient will usually comprise a carrier and/or a diluent either liquid or solid. Suitable liquid carriers include water, petroleum distillates or other liquid carriers with or without surfactants. Liquid concentrates may be prepared by dissolving one of the sulfur-containing compounds with a nonphytotoxic solvent such as acetone, Xylene, or nitrobenzene and dispersing the active ingredient in water with the aid of suitable surface active emulsifying and dispersing agents. The choice of dispersing and emulsifying agent and the amount used is dictated by the ability of the agent to facilitate the dispersion of the active ingredient. For solid carriers such as wettable powders or dusts. the active ingredient is dispersed in and on an appropriately divided carrier such as clay, talc, bentonite, diatomaceous earth, and the like.

Formulations useful in the conduct of the method of this invention can also contain other optional ingredients such as stabilizers or other biologically active compounds, insofar as they do not impair or reduce the activity of the sulfur-containing compounds towards the nematodes.

Treatment of seed, seed pieces, or roots can be accomplished by coating, spraying, dipping, dusting, or otherwise covering the organ with the active ingredient with or without carriers, diluents and the like. Both formulated and technical materials containing the active ingredient may be used in the method of this invention. Seed or seed piece treatments ranging from 0.1 to 10.0 percent active ingredient by weight of seed or seed pieces are generally effective depending on the particular sulfur-containing compound, plant species, and degree of control required. Dipping of roots or seed pieces into solutions consisting of the active ingredient plus appropriate carriers, diluents, surface active agents, and emulsifying or dispersing agents is effective at rates ranging from 0.001 to 10.0 percent active ingredient. Dipping times ranging from a few seconds to several hours are effective. Rates of application of active ingredient and exposure time are dependent upon the plant species treated, the nematode pests to be controlled, and the degree of control desired.

In the following examples, the formulations uutilized were diluted with water to give a suspension containing the active ingredient at the concentrations set forth in each example. Conventional means were utilized to coat seeds with both formulation and technical materials. Seeds were coated with a formulation by rotating in a standard rotary coating pan containing the specified formulation until dry. The thiodicarb technical methomyl technical and other technical materials were dissolved in an acetone/triton mixture to give a suspension containing the specified technical material at the concentrations set forth in the examples. Seeds were coated with a technical material by stirring in the specified technical material/acetone/triton suspension and evaporating the acetone with an air hose. Thiodicarb technical is available from Union Carbide Agricultural products Company. Inc., Research Triangle park, N.C. and methomyl technical is available from E.I. du Pont de Nemours & Co., Inc. Agricultural Chemicals Dept., Wilmington, Del.

EXAMPLE 1

Soybean seeds treated with LARVIN® brand thiodicarb insecticide 375 F, commercially available from Union Carbide Agricultural Products Company, Inc. Research Triangle Park, N.C., were planted in 10 centimeter fiber pots containing natural field soil. The concentrations of thiodicarb employed (milligrams per 10 grams of soybean seeds) are given in Table I below. At the time of planting, the natural field soil was inoculated with *Heterodera glycines* eggs and juveniles collected from crushed cysts. The treated soybean seeds were germinated and the root systems tested for nematode control 13 days after planting. The results are given in Table I. The top weight of the seedlings was determined 13 days after planting, and these results are also given in Table I. Nematode control was determined by root staining and observation in which the roots were stained by boiling in acid fuchsin-acetic acid following a 4 minute NaOCl pre-treatment. The top weight and nematode control results in Table I are the average of 3 repetitions

TABLE I

| Soybean Seed Treatment | | |
|---|---|---|
| Thiodicarb Concentration (mg/10 gm seed) | Soybean Plant Top Weight (gm) | No. of *H. Glycines* Juveniles/Root System |
| Control (Untreated) | 3.3 | 132 |
| 30 | 3.4 | 21 |
| 60 | 3.4 | 9 |

The results from Table I illustrate a significant reduction of *H. glycines* juveniles in soybean root systems grown from thiodicarb treated soybean seeds in comparison with soybean root systems groWn from untreated soybean seeds without any negative effect on plant growth.

EXAMPLE 2

Cotton seeds treated with LARVIN® brand thiodicarb insecticide 75 WP, commercially available from Union Carbide Agricultural Products Company. Inc., Research Triangle Park, N.C., plus Soilserve seed sticker were planted in 10 centimeter fiber pots containing artificial soil (peatmoss and sand). The concentrations of thiodicarb employed (milligrams per 10 grams of cotton seeds) are given in Table II below. At the time of planting, the artificial soil was inoculated with *Meloidogyne incognita* eggs collected by NaOCl extraction in a water suspension. The treated cotton seeds were germinated and the root systems observed for galling 30 days after planting. The results are given in Table II. Nematode control was determined by root gall ratings based on observation in which the rating scale used was as follows:

Rating scale of 1–5 wherein 1 indicates heavy galling and 5 indicates no galling. The gall rating results in Table II are the average of 3 repetitions.

TABLE II

| Cotton Seed Treatment | |
|---|---|
| Thiodicarb Concentration (mg/10 gm seed) | Gall Rating |
| Control (Untreated) | 1.0 |
| 50 | 3.0 |
| 100 | 3.3 |
| 200 | 4.3 |
| 400 | 4.7 |

The results from Table II illustrate significantly less galling from *M. incognita* in cotton root systems grown from thiodicarb treated cotton seeds in comparison with cotton root systems grown from untreated cotton seeds.

EXAMPLE 3

Tomato seedlings (4–6 centimeters in height) were removed from germination flats and their root systems were washed and immersed in either LARVIN® brand thiodicarb insecticide 375 F formulated to give 1 percent thiodicarb, commercially available from Union Carbide Agricultural Products Company. Inc., Research Triangle park, N.C., LANNATE® brand methomyl insecticide 225 formulated to give 1 percent methomyl commercially available from E. I. du Pont de Nemours & Co., Inc., Agricultural Chemical Dept., Wilmington. Del., thiodicarb technical or methomyl technical. The immersion period (exposure time) for each tomato seedling is given in Table III below. Following the immersion period, the tomato seedlings were planted in 10 centimeter fiber pots containing sterilized (fumigated) field soil. At the time of planting the treated tomato seedlings, the sterilized field soil was inoculated with *Meloidogyne incognita* eggs collected by NaOCl extraction in a water suspension. The tomato root systems were observed for galling and egg masses 33 days after bare root dip treatment. The results are given in Table III. Nematode control was determined by root gall and egg mass ratings based on observation in which the rating scale used was as follows:

Rating scale of 1–5 wherein 1 indicates heavy galling (numerous egg masses) and 5 indicates no galling (egg masses absent). The root gall and egg mass ratings and the top weight results in Table III are the average of 3 repetitions.

TABLE III

| Tomato Seedling Bare Root Dip Treatment | | | |
|---|---|---|---|
| Formulation | Exposure Time (min.) | Gall Rating | Egg Mass Rating |
| Control (water) | 30 | 1.0 | 1.0 |
| Control (Acetone) | 30 | 1.0 | 1.0 |
| LARVIN 375 F | 1 | 3.0 | 5.0 |
| | 5 | 3.3 | 5.0 |
| | 15 | 3.0 | 4.6 |
| | 30 | 3.0 | 5.0 |
| Thiodicarb Technical | 30 | 3.0 | 5.0 |
| LANNATE 225 | 1 | — | — |
| | 5 | — | — |
| | 15 | — | — |
| | 30 | — | — |
| Methomyl Technical | 30 | — | — |

The results from Table III illustrate significantly less galling and egg masses from *M. incognita* in tomato root systems treated with thiodicarb (bare root dip treatment) in comparison with untreated tomato root systems (no bare root dip treatment). The tomato seedlings in which the root systems were treated with LANNATE® brand methomyl insecticide 225 and methomyl technical exhibited marked phytotoxicity and were all dead within 48 hours after treatment.

EXAMPLE 4

Cucumber seeds treated with the various compounds identified in Table IV below were planted in 10 centimeter fiber pots containing artificial soil (peatmoss and sand). Each compound was employed as a technical material at a concentration of 500 milligrams per 10 grams of cucumber seeds. At the time of planting, the artificial soil was inoculated with *Meloidocvne incognito* eggs collected by NaOCl extraction in a water suspension. The treated cucumber seeds were germinated and the root systems observed for galling 40 days after planting, The results are given in Table IV. Nematode control was determined by root gall ratings based on observation in which the rating scale used was as follows:

Rating scale of 1–5 wherein 1 indicates heavy galling and 5 indicates no galling. The gall rating results in Table IV are the average of 3 repetitions.

TABLE IV

| | Cucumber Seed Treatment | |
|---|---|---|
| | Compound Structure | Gall Rating |
| (i) | Control (Untreated) | 1.0 |
| (ii) | 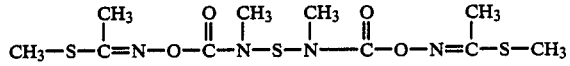 | 3.3 |
| (iii) | 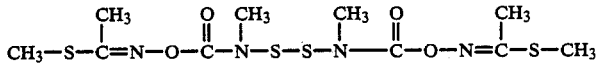 | 4.0 |
| (iv) | 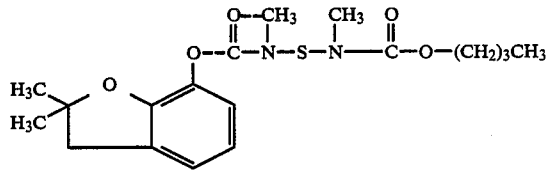 | 2.7 |
| (v) | 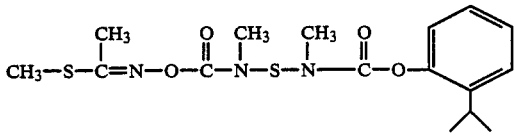 | 3.0 |
| (vi) | 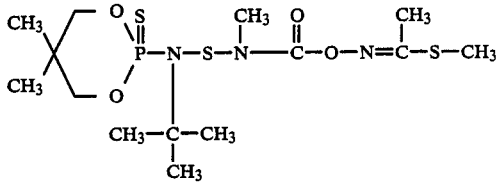 | 2.7 |
| (vii) | 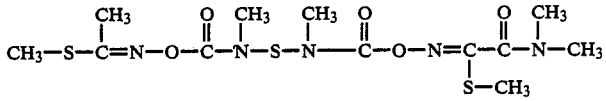 | 4.7 |
| (viii) | 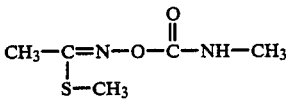 | 2.3 |

Compound (ii) is thiodicarb and is commercially available from Union Carbide Agricultural Products Company, Inc., Research Triangle park, N.C. Compound (iii) was prepared in a manner similar to the procedure described in U.S. Pat. No. 4,327,110. Compound (iv) was prepared in a manner similar to the procedure described in U.S. Pat. No. 4,341,795. Compounds (v) and (vii) were prepared in a manner similar to the procedure described in U.S. Pat. No. 4,551,472. Compound (vi) is available from The Upjohn Company, Kalamazoo, Mich. Compound (viii) is methomyl and is commercially available from E. I. du pont de Nemours & Co., Inc., Agricultural Chemical Dept., Wilmington, Del.

The results from Table IV illustrate significantly less galling from *M. incognita* in cucumber root systems grown from the treated cucumber seeds in comparison with cucumber root systems grown from untreated cucumber seeds. Phytotoxicity was observed in cucumber plants which had been seed treated with compound (viii) i.e., methomyl.

EXAMPLE 5

Tomato seedlings (4–6 centimeters in height) were removed from germination flats and their root systems were washed and immersed in either LARVIN® brand thiodicarb insecticide 375 F formulated to give 1 percent thiodicarb. or LARVIN® brand thiodicarb insecticide 75 WP formulated to give 1 percent thiodicarb both commercially available from Union Carbide Agricultural products Company Inc., Research Triangle Park, N.C. The immersion period (exposure time) for each tomato seedling is given in TabIe V below. Following the immersion period. the tomato seedlings were planted in 10 centimeter fiber pots containing sterilized (fumigated) field soil. At the time of planting the treated tomato seedlings, the sterilized field soil was inoculated with *Meloidogyne incognita* eggs collected by NaOCl extraction in a water suspension. The tomato seedling foliage was inoculated with the larvae of Southern Armyworm (*Spodoptera eridania,* (Cram.)) 18 days after bare root dip treatment. The tomato root systems were tested for nematode control 18 days after bare root dip treatment. The results are given in Table V. The percent mortality of Southern Armyworm (SAW) was determined 19 days after bare root dip treatment (24 hour feeding period), and these results are also given in Table V. Nematode control was determined by root staining and observation in which the roots were stained by boiling in acid fuchsin-acetic acid following a 4 minute NaOCl pre-treatment. The percent mortality Southern Armyworm was determined by counting the number of dead larvae. Larvae which were unable to move the length of the body, even upon stimulation by prodding were considered dead. The nematode control and percent mortality Southern Armyworm results in Table V are the average of 3 repetitions.

TABLE V

| Tomato Seedling Bare Root Dip Treatment | | | |
|---|---|---|---|
| Formulation | Exposure Time (hr) | No. of *M. incognita* Juveniles/ 0.5 gm Root | SAW Percent Mortality |
| Control (Untreated) | 1 | 172 | 0 |
| | 24 | 173 | 0 |
| LARVIN 75 WP | 1 | 3 | 100 |
| | 24 | 4 | 100 |
| LARVIN 375 F | 1 | 4 | 100 |
| | 24 | 2 | 100 |

The results from Table V illustrate a significant reduction of *M. incognita* juveniles in tomato root systems treated with thiodicarb (bare root dip treatment) in comparison with untreated tomato root systems no bare root dip treatment). The Southern Armyworm foliage feed test evidenced the translocation (systemic activity) of thiodicarb to the tomato seedling foliage.

EXAMPLE 6

Corn seeds treated with LARVIN® brand thiodicarb insecticide 3.6 F and LARVIN® brand thiodicarb insecticide 500 F plus graphite, both commercially available from Union Carbide Agricultural products Company. Inc., Research Triangle park N.C., were planted in 10 centimeter fiber pots containing natural field soil. The concentrations of thiodicarb employed (milligrams per 10 grams of corn seeds) are given in Table VI below. At the time of planting. the natural field soil was inoculated with *Meloidogyne incognita* eggs collected by NaOCl extraction in a water suspension. The treated corn seeds were germinated and the root systems tested for nematode control 8 days after planting. The results are given in Table VI. Nematode control was determined by root staining and observation in which the roots were stained by boiling in acid fuchsin-acetic acid following a 4 minute NaOCl pre-treatment. The nematode control results in Table VI are the average of 3 repetitions.

TABLE VI

| Corn Seed Treatment | | |
|---|---|---|
| Formulation | Thiodicarb Concentration (mg/10 gm seed) | No. of *M. incognita* Juveniles/gm Root |
| Control (Untreated) | 0 | 18 |
| LARVIN 3.6 F | 50 | 2 |
| | 163 | 1 |
| | 241 | 1 |
| LARVIN 500 F + | 90 | 1 |
| Graphite | 129 | 0 |

The results from Table VI illustrate a significant reduction of *M. incognita* juveniles in corn root systems grown from thiodicarb treated corn seeds in comparison with corn root systems grown from untreated corn seeds.

EXAMPLE 7

Cotton seeds treated with LARVIN® brand thiodicarb insecticide 80 DF, commercially available from Union Carbide Agricultural products Company, Inc., Research Triangle park, N.C., were planted in 10 centimeter fiber pots containing artificial soil (peat moss and sand). The concentrations of thiodicarb employed in weight (ounces) per hundred pounds (cwt) of cotton seeds are given in Table VII below. At the time of planting the artificial soil was infested with *Helicotylenchus dihystera. Hoplolaimus galeatus, Paratrichodorus christiei, Pratylenchus brachyurus,* and *Tylenchorhynchus claytoni* nematode species. The cotton seeds were germinated and the root systems tested for nematode control 8 weeks after planting. Nematode populations in the soil were also determined based on a 100 cubic centimeter sample of the soil, The results are given in Table VII. The procedures used for determining nematode populations in root systems and nematode populations in soil are described in Rodriguez-Kabana. R. et al.. 1981. Nematropica 1:175–186. The results in TabIe VII are the average of 8 repetitions.

TABLE VII

| Thiodicarb Concentration (oz/cwt) | Cotton Seed Treatment: No. of Nematodes - Root System | | | | No. of Nematodes-Soil System | |
|---|---|---|---|---|---|---|
| | *P. brachyurus* | *T. claytoni* | *H. dihystera* | *H. galeatus* | *P. christiei* | *T. claytoni* |
| Control (untreated) | 107 | 109 | 941 | 56 | 364 | 129 |
| 6 | 19 | 40 | 335 | 15 | 236 | 28 |
| 8 | 8 | 37 | 273 | 7 | 144 | 47 |

The results from Table VII illustrate a significant reduction of all nematode species in cotton root systems grown from thiodicarb treated cotton seeds in comparison with cotton root systems grown from untreated cotton seeds, and also a significant reduction of *p. christiei* and *T. claytoni* populations in soil systems having thiodicarb treated cotton seeds germinated therein in comparison with soil systems having untreated cotton seeds germinated therein.

EXAMPLE 8

Soybean seeds treated with LARVIN® brand thiodicarb insecticide 90 MC, commercially available from Union Carbide Agricultural products Company, Inc., Research Triangle park. N.C., and with one or both of the fungicides ORTHOCIDE® brand captan fungicide 30 DD commercially available from Chevron Chemical Company, Ortho Agricultural Chemicals Division, San Francisco, Calif., and VITAVAX® brand carboxin fungicide 30 C commercially available from Uniroyal Chemical, Division of Uniroyal Inc., Middlebury, Conn., were planted in 10 centimeter fiber pots containing natural field soil. The concentrations of thiodicarb, captan and carboxin employed in weight (ounces) per hundred pounds (cwt) of soybean seeds are given in Table VIII below. At the time of planting, the natural field soil was infested with *Meloidogyne incognita, Paratrichodorus christiei, Heterodera glycines* and Sapronhagus nematode species. Saprophagus is a group of free-living nematodes which are not plant parasitic, The soybean seeds were germinated and the root systems tested for nematode control 8 weeks after planting. The results are given in Table VIII. The procedure used for determining the nematode populations in the root systems is described in Rodriguez-Kabana, R. et al.. 1981. Nematropica 11:175–186. The results in Table VIII are the average of 8 repetitions.

TABLE VIII

| Thiodicarb Concentration (oz/cwt) | Captan Concentration (oz/cwt) | Carboxin Concentration (oz/cwt) | Soybean Seed Treatment: No. of Nematodes - Root System | | | |
|---|---|---|---|---|---|---|
| | | | *M. incognita* | *P. christiei* | *H. glycines* | Saprophagus |
| Control (untreated) | — | — | 730 | 22 | 5 | 128 |
| 16 | 3.3 | 0 | 263 | 12 | 3 | 128 |
| 16 | 3.3 | 3.3 | 256 | 2 | 0 | 102 |
| 24 | 3.3 | 0 | 110 | 1 | 1 | 52 |
| 24 | 3.3 | 3.3 | 131 | 2 | 0 | 83 |
| 32 | 3.3 | 0 | 219 | 2 | 0 | 59 |
| 32 | 3.3 | 3.3 | 102 | 1 | 0 | 74 |

The results from TabIe VII illustrate a slgnificant reduction of all nematode species in soybean root systems grown from thiodicarb treated soybean seeds in comparison with soybean root systems grown from untreated soybean seeds.

EXAMPLE 9

Rye seeds (*Secale cereale*) treated with LARVIN® brand thiodicarb insecticide 90 MC, commercially available from Union Carbide Agricultural products Company, Inc., Research Triangle park N.C., and with on or both of the fungicides, ORTHOCIDE® brand captan fungicide 30 DD commercially available from Chevron Chemical Company, Ortho Agricultural Chemicals Division, San Francisco, Calif., and VITAVAX® brand carboxin fungicide 30 C commercially available from Uniroyal Chemical, Division of Uniroyal, Inc., Middlebury, Conn., were planted in 10 centimeter fiber pots containing natural field soil. The concentrations of thiodicarb, captan and carboxin employed in weight (ounces) per hundred pounds (cwt) of rye seeds are given in Table IX below. At the time of planting, the natural field soil was infested wirh *Paratrichodorus christiei* and Saprophagus nematode species. Saprophagus is a group of free-living nematodes which are not plant parasitic. The rye seeds were germinated and the root systems tested for nematode control 6 weeks after planting. The results are given in Table IX. The procedure used for determining the nematode populations in the root systems is described in Rodriguez-Kabana, R. et. al., 1981. Nematropica 11:175–186. The results in Table IX are the average of 8 repetitions.

TABLE IX

| Thiodicarb Concentration (oz/cwt) | Captan Concentration (oz/cwt) | Carboxin Concentration (oz/cwt) | Rye Seed Treatment: No. of Nematodes - Root System | |
|---|---|---|---|---|
| | | | *P. christiei* | Saprophagus |
| Control (untreated) | — | — | 39 | 21 |
| 16 | 3.3 | 0 | 16 | 12 |
| 16 | 3.3 | 3.3 | 25 | 10 |
| 24 | 3.3 | 0 | 16 | 16 |
| 24 | 3.3 | 3.3 | 5 | 6 |
| 32 | 3.3 | 0 | 7 | 15 |
| 32 | 3.3 | 3.3 | 7 | 6 |

The results from Table IX illustrate a significant reduction of all nematode species in rye root systems grown from thiodicarb treated rye seeds in comparison with rye root systems grown from untreated rye seeds.

EXAMpLE 10

Wheat seeds (*Triticum aestivum*) treated with LARVIN® brand thiodicarb insecticide 90 MC, commercially available from Union Carbide Agricultural Products Company, Inc., Research Triangle Park, N.C., and with one or both of the fungicides, ORTHOCIDE® brand captan fungicide 30 DD commercially available from Chevron Chemical Company, Ortho Agricultural Chemicals Division, San Francisco, Calif., and VITAVAX® brand carboxin fungicide 30 C commercially available from Uniroyal Chemical, Division of Uniroyal. Inc., Middlebury, Conn., were planted in 10 centimeter fiber pots containing natural field soil. The concentrations of thiodicarb, captan and carboxin employed in weight (ounces) per hundred pounds (cwt) of wheat seeds are given in Table X below. At the time of planting, the natural field soil was infested with *Meloidogyne incognita, Paratrichodorus christiei* and Saprophagus nematode species. Saprophagus is a group of free-living nematodes which are not plant parasitic. The wheat seeds were germinated and the root systems tested for nematode control 6 weeks after planting. The results are given in Table X. The procedure used for determining the nematode populations in the root systems is described in Rodriguez-Kabana, R. et al., 1981. Nematropica 11:175–186. The results in Table X are the average of 8 repetitions.

TABLE X

| Wheat Seed Control | | | | | |
|---|---|---|---|---|---|
| Thiodicarb Concentration (oz/cwt) | Captan Concentration (oz/cwt) | Carboxin Concentration (oz/cwt) | No. of Nematodes - Root System | | |
| | | | *M. incognita* | *P. christiei* | Saprophagus |
| Control (untreated) | — | — | 221 | 30 | 55 |
| 16 | 3.3 | 0 | 146 | 3 | 14 |
| 16 | 3.3 | 3.3 | 62 | 2 | 8 |
| 24 | 3.3 | 0 | 69 | 7 | 1 |
| 24 | 3.3 | 3.3 | 57 | 2 | 10 |
| 32 | 3.3 | 0 | 86 | 1 | 2 |
| 32 | 3.3 | 3.3 | 44 | 1 | 1 |

The results from Table X illustrate a significant reduction of all nematode species in wheat root systems from thiodicarb treated wheat seeds in comparison with wheat root systems grown from untreated wheat seeds.

It will be understood that the nematode species employed in the above tests are merely representative of a wide variety of nematodes that can be controlled by he sulfur-containing compounds represented by the generic formula 1.

Although the invention has been illustrated by the preceeding examples, it is not to be construed as being limited thereby; but rather, the invention encompasses the generic area as hereinbefore disclosed. Various modifications and embodiments can be made without departing from the spirit and scope thereof.

We claim:

1. A method of protecting plants from plant parasitic nematodes comprising applying to the locus of nematode infestation a plant protectant amount of a compound having the formula:

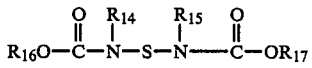

wherein:

$R_{14}$ and $R_{15}$ are independently alkyl radicals having from 1 to 4 carbon atoms;

$R_{16}$ is tetrahydronaphthyl, naphthyl, benzothienyl, dihydrobenzofuranyl, benzofuranyl or:

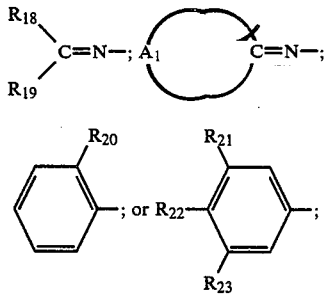

$R_{17}$ is other than $R_{16}$ and is a substituted or unsubstituted alkyl, cycloalkyl, phenylalkyl, naphthylalkyl or a heterocycloalkyl group, wherein the heterocyclic moiety is a five-or six-member ring which includes in any combination, one or two oxygen, sulfur, sulfinyl or sulfonyl groups and which may also include one divalent, amino, alkylamino or carbonyl group; wherein the permissible substituents on said groups are one or more halogen, nitrile, nitro, alkyl, alkylthio, alkylsulfinyl, alkylsulfonyl, alkoxy, alkoxycarbonylamino, or alkylcarbonylamino groups in any combination, or $R_{17}$ is alkoxyalkyleneoxyalkyl, alkoxy(dialkyleneoxy)alkyl or alkoxy-(trialkyleneoxy)alkyl;

$R_{18}$ is hydrogen, alkyl, alkylthio or cyano;

$R_{19}$ is alkyl, alkylthio, alkoxy, alkanoyl or alkoxycarbonyl, all of which may be unsubstituted or aliphatically substituted in any combination with one or more cyano, nitro, alkylthio, alkylsulfinyl, alkylsulfonyl, alkoxy, aminocarbonyl, alkylaminocarbonyl, or dialkylaminocarbonyl groups; or $R_{19}$ is phenyl, aminocarbonyl, alkylaminocarbonyl, dialkylaminocarbonyl or a $R_{24}$ CONH— or $R_{24}$CON(alkyl)— group, where $R_{24}$ is hydrogen, alkyl, alkoxy or alkylthio; and $A_1$ is a divalent aliphatic chain, completing a five or six member ring, which includes in any combination, one or two oxygen, sulfur, sulfinyl or sulfonyl groups and which may also include one divalent amino, alkylamino or carbonyl group;

$R_{20}$ is alkoxy, alkylthio, alkyl, alkylthioalkyl 2-dioxalanyl, 2-dithioanyl, 2-oxathioanyl, substituted alkoxy in which the permissible substituents are alkoxy and haloalkyl in any combination, or halogen;

$R_{21}$ is alkyl;

$R_{22}$ is hydrogen, alkyl, halogen, alkylthio, alkysulfinyl, alkylsulfonyl, alkoxy, dialkylamino, formylamino, alkylcarbonylamino, alkoxycarbonylamino or dialkylaminomethyleneimino; and $R_{23}$ is hydrogen or alkyl.

2. A method of protecting plants from plant parasitic nematodes comprising applying to the locus of nematode infestation a plant protectant amount of a compound having the formula:

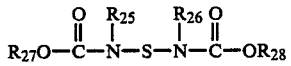

wherein:

$R_{25}$ and $R_{26}$ are individually alkyl radicals having from 1 to 4 carbon atoms;

$R_{27}$ is

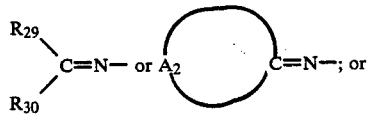

$R_{27}$ is alkynyl;

$R_{28}$ is other than $R_{27}$ and is alkenyl, alkynyl, phenyl, benzofuranyl, dihydrobenzofuranyl, benzothienyl, naphthyl or tetrahydronaphthyl all of which may be either unsubstituted or substituted with one or more halogen, nitro, nitrile, alkyl, alkylthio, alkylthioalkyl, methylenedioxy, amino, alkylamino, dialkylamino, alkoxycarbonylamino, dialkylaminoalkyleneimino, alkylcarbonylamino, formylamino, dicyanoethylidene, alkoxy, alkynyloxy, phenoxy, phenyl, 2-dithianyl, 2-dithiolanyl, 2-dioxalanyl, 2-oxathianyl, 2-oxathiolanyl, 2-dioxanyl or 4-oximino-1,3-dithiolanyl groups in any combination; or $R_{28}$ is:

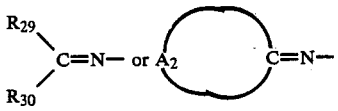

wherein:

$R_{29}$ is hydrogen, alkyl, alkylthio or cyano;

$R_{30}$ is alkyl, alkylthio, alkylthioalkyl, alkoxy, aroyl, alkanoyl or alkoxycarbonyl, all of which may be unsubstituted or aliphatically substituted in any combination with one or more cyano, nitro, alkylthio, alkylsulfinyl, alkylsulfonyl, alkoxy, aminocarbonyl, dialkylaminocarbonyl or alkylaminocarbonyl groups; or $R_{30}$ is phenyl, aminocarbonyl, alkylaminocarbonyl, dialkylaminocarbonyl or an $R_{31}$ CONH— or $R_{31}$ CON(alkyl)group where $R_{31}$ is hydrogen, alkyl or alkoxy; and $A_2$ is a divalent aliphatic chain, completing a five or six member ring, which includes one or two divalent oxygen, sulfur, sulfinyl or sulfonyl groups and which may also include one divalent amino, alkylamino or carbonyl group in any combination; or A, may also complete a six membered ring which includes three divalent sulfur, sulfinyl or sulfonyl groups in any combination.

3. A method of protecting plants from plant parasitic nematodes comprising applying to the locus of nematode infestation a plant protectant amount of a compound having the formula:

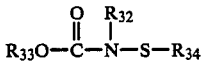

wherein:

$R_{32}$ is hydrogen, alkyl, alkenyl, alkoxy, or cycloalkyl, either unsubstituted or except where $R_{32}$ is hydrogen, substituted with one or more chloro, bromo, fluoro, nitro or cyano substitutents in any combination, or phenyl or phenylalkyl, either unsubstituted or substituted with one or more chloro, bromo, fluoro, nitro, cyano, alkyl, haloalkyl or alkoxy substitutents in any combination:

$R_{34}$ is

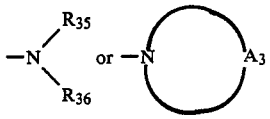

wherein:

$R_{35}$ and $R_{36}$ are individually hydrogen, alkyl, alkenyl, alkoxy, cycloalkyl, phenylalkyl or phenyl, all of which may be unsubstituted or substituted, except in the case of hydrogen, with one or more chloro, bromo, fluoro, nitro, cyano, alkyl, haloalkyl, or alkoxy substituents in any combination; or a saturated or unsaturated five or six membered heterocyclic radical in which there are one or two hetero atoms which may be oxygen, sulfur in all of its oxidation states or nitrogen, including combinations thereof, all of which heterocyclic radicals may be unsubstituted or substituted with one or more chloro, bromo, fluoro, nitro, cyano, alkyl, haloalkyl, or alkoxy substituents in any combination:

$A_3$ is a divalent aliphatic chain which may be alkylene, alkenylene or an aliphatic chain which may include one or two hetero atoms of oxygen, sulfur in all of its oxidation states or nitrogen or a combination thereof to form a five or six membered ring structure, which may be unsubstituted or substituted with one or more chloro, bromo, fluoro, nitro, cyano, alkyl, haloalkyl or alkoxy substituents in any combination:

$R_{33}$ is an imino group of the formula:

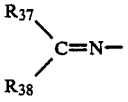

wherein: $R_{37}$ and $R_{38}$ are individually hydrogen, cyano or chloro radicals or are alkyl, alkenyl, alkylthio, alkoxy, aryl, arylthio, carbamoyl, aminocarbonylalkyl or carbonylaminoalkyl groups or are joined together by a saturated or unsaturated divalent aliphatic chain which may be interrupted by one or more sulfur in all of its oxidation states, oxygen or nitrogen atoms to form a five or six membered ring all of which may be substituted by one or more chloro, bromo, fluoro, nitro, cyano, alkyl, alkylthio, alkylsulfinyl, alkylsulfonyl, or alkoxy substituents in any combination.

4. A method of protecting plants from plant parasitic nematodes comprising applying to the locus of nematode infestation a plant protectant amount of a compound having the formula:

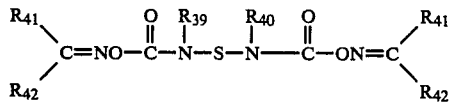

wherein:

$R_{39}$, $R_{40}$ and $R_{41}$ are independently alkyl having from 1 to 8 carbon atoms; and $R_{42}$ is independently alkylthio, alkylsulfinyl, alkylsulfonyl or alkylthioalkyl.

5. A method of protecting plants from plant parasitic nematodes comprising applying to the locus of nematode infestation a plant protectant amount of a compound having the formula:

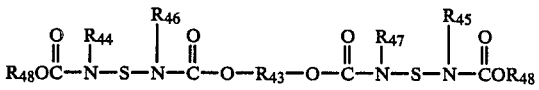

wherein:

$R_{43}$ is:

A. a substituted or unsubstituted divalent alkylene, alkenylene, alkynylene, monocyclic arylene, bicyclic arylene, biphenylene or a divalent alkylene chain which includes one oxygen, sulfur, sulfinyl, sulfonyl or nitrogen, wherein the permissible substituents are one or more alkyl, fluoro, nitro, chloro or bromo groups in any combination: or B. A divalent organic radical of the formula:

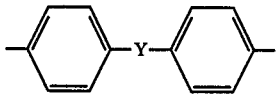

wherein: Y is oxygen, sulfur, sulfinyl, sulfonyl, alkylene, haloalkylene. alkenylene or haloalkenylene:

$R_{44}$, $R_{45}$, $R_{46}$ and $R_{47}$ are independently alkyl having from one to four carbon atoms;

$R_{48}$ is:

A. dihydrobenzofuranyl, naphthyl, tetrahydronaphthyl, benzothienyl, indanyl, benzodioxalanyl, benzofuranyl or benzodioxanyl groups, all of which may be either unsubstituted or substituted with one or more alkyl groups in any combination: or B. phenyl, either unsubstituted or substituted with one or more halo, cyano, nitro, cycloalkyl, alkyl, alkylthio, alkylsulfinyl 2-dithiolanyl, alkylsulfonyl, alkylthioalkyl, alkylsulfinylalkyl, 2-dioxalanyl, alkylsulfonylalkyl, amino, alkylamino, dialkylamino, alkynyloxy, alkoxycarbonylamino, trihalomethyl, N, N-dialkylformamidino, or alkoxy in any combination; or

C.

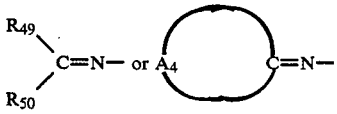

wherein:

$R_{49}$ is hydrogen, alkyl, alkylthio, alkylsulfinyl, alkylsulfonyl, aminocarbonyl, alkylaminocarbonyl, dialkylaminocarbonyl or cyano;

$R_{50}$ is alkyl, alkylthio, alkylsulfinyl, alkylsulfonyl, aminocarbonyl, alkylaminocarbonyl, dialkylaminocarbonyl or alkanoyl, all of which may be unsubstituted or, except for aminocarbonyl, substituted with one or more cyano, amido, nitro, alkylthio, alkylsulfonyl or alkylsulfinyl in any combination; and $A_4$ is a divalent alkylene chain having from 2 to 24 aliphatic carbon atoms completing a five or six membered ring structure which includes one, two or three groups selected from divalent oxygen, sulfur, sulfinyl, sulfonyl, amino, alkylamino, alkylimino or carbonyl groups in any combination.

6. A method of protecting plants from plant parasitic nematodes comprising applying to the locus of nematode infestation a plant protectant amount of a compound having the formula:

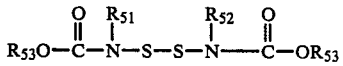

wherein:

$R_{51}$ and $R_{52}$ are independently alkyl having from 1 to 4 carbon atoms;

$R_{53}$ is:

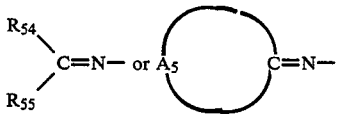

wherein:

$R_{54}$ is hydrogen, chloro, cyano, alkyl, alkylthio or cyanoalkylthio;

$R_{55}$ is alkyl, alkylthio, alkoxy, alkanoyl, benzoyl, alkoxycarbonyl, alkylsulfonyl, alkylsulfinyl, alkenyl, alkynyl or phenyl, all of which may be substituted in any combination with one or more cyano, nitro, fluoro, bromo, chloro, alkylthio, alkylsulfinyl, alkylsulfony, alkoxy, phenoxy, carbamoyl, alkylcarbamoyl, dialkylcarbamoyl or

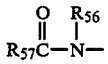

wherein:

$R_{56}$ is hydrogen or alkyl;

$R_{57}$ is hydrogen, alkyl, alkoxy or alkylthio; and $A_5$ is a divalent alkylene chain having from 2 to 24 aliphatic carbon atoms completing a five or six membered alicyclic ring which includes one, two or three groups selected from divalent oxygen, sulfur, sulfinyl, sulfonyl, amino, alkylamino, alkylimino or carbonyl groups in any combination.

7. A method of protecting plants from plant parasitic nematodes comprising applying to the locus of nematode infestation a plant protectant amount of a compound having the formula:

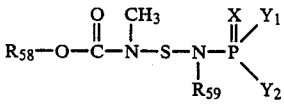

-continued

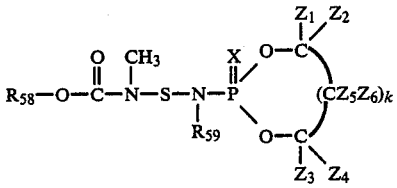

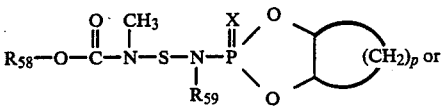

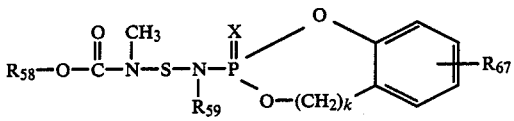

wherein $R_{58}$ is selected from

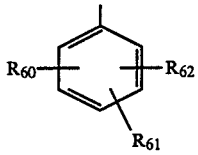

wherein $R_{60}$, $R_{61}$ and $R_{62}$ are the same or different and are hydrogen, alkylyn, halogen, alkoxy, alkylthio, dialkylamino or —N=CHN$(CH_3)_2$;

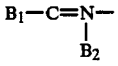

(ii)

wherein $B_1$ and $B_2$ are the same or different and are alkyl, alkylthio, monocyano substituted alkylthio, phenylthio wherein phenyl may be unsubstituted or substituted with one or more substituents which may be the same or different and are halogen, alkyl, cyano, alkoxy, phenyl and hydrogen, with the proviso that when $B_1$ is hydrogen, then $B_2$ is of the formula

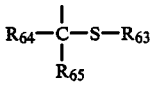

wherein $R_{63}$ is alkyl or phenyl; $R_{64}$ is alkyl; $R_{65}$ is alkyl or $SR_{66}$, wherein $R_{66}$ is alkyl and is the same alkyl group as $R_{63}$, and taking $R_{63}$ and $R_{66}$ together with the atoms to which they are attached may form a dithio heterocyclic of the formula

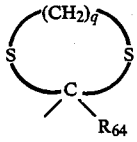

wherein q is 2 or 3 and the alkylene portion of the ring is unsubstituted or substituted with one or two methyl groups; $B_1$ and $B_2$ taken together with the carbon atom to which they are attached may form a dithio heterocyclic of the formula

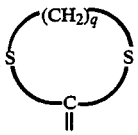

wherein the alkylene portion of the ring is unsubstituted or substituted with one to two methyl groups; and

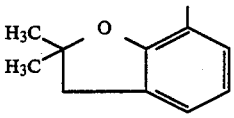

(iii)

$R_{59}$ is alkyl, phenyl, substituted phenyl, phenyl-alkyl, and cycloalkyl; X is oxygen or sulfur; $Y_1$ and $Y_2$ are the same or different and are alkyl, alkoxy, alkylthio, cycloalkyl, phenyl, substituted phenyl, phenoxy, substituted phenoxy, thiophenoxy, and substituted thiophenoxy; $Z_1$ through $Z_6$ are the same or different and are hydrogen, methyl and ethyl; k is zero or one, p is three or four; and $R_{67}$ is hydrogen, alkyl, alkoxy and halogen.

8. A method of protecting plants from plant parasitic nematodes comprising applying to the locus of nematode infestation a plant protectant amount of a compound having the formula:

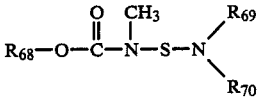

wherein $R_{68}$ is

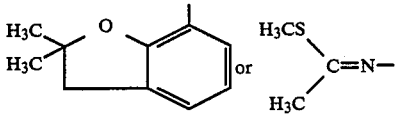

and $R_{69}$ and $R_{70}$ are the same or different and are alkyl, cycloalkyl, benzyl which is unsubstituted or substituted with halogen, alkyl or alkoxy in any combination, phenyl which is unsubstituted or substituted with halogen. alkyl or alkoxy, —$X_1$—$COOR_{71}$ or —$Y_3$—CN in any combination in which $X_1$ and $Y_3$ are each straight-chain or branched-chain alkylene and $R_{71}$ is alkyl or cycloalkyl, or $R_{69}$ and $R_{70}$, when taken together, may represent a 5- or 6-membered heterocyclic ring which may contain a sulphur or oxygen atom.

9. A method of protecting plants from plant parasitic nematodes comprising applying to the locus of the nematode infestation a plant protectant amount of a compound having the formula:

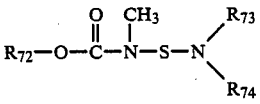

wherein $R_{72}$ is

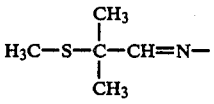

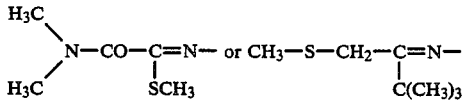

wherein:

$R_{73}$ and $R_{74}$ are independently $—X_2—COOR_{75}$, or $—Y_4—CN$;

$X_2$ and $Y_4$ are independently alkylene;

$R_{75}$ is alkyl or cycloalkyl; or $R_{74}$ is alkyl, cycloalkyl, alkoxyalkyl, unsubstituted or substituted phenyl in which the permissible substitutents are halogen, alkyl or alkoxy in any combination, unsubstituted or substituted benzyl in which the permissible substituents are halogen, alkyl or alkoxy in any combination or $—Z_7—R_{76}$;

$Z_7$ is carbonyl or sulphony;

$R_{76}$ is alkyl, alkoxy, phenoxy, or unsubstituted or substituted phenyl in which the permissible substituent is alkyl in any combination.

10. A method of protecting plants from plant parasitic nematodes comprising applying to the locus of the nematode infestation a plant protectant amount of a compound having the formula:

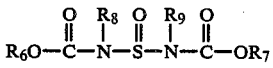

wherein:

$R_6$ and $R_7$ are the same and are:

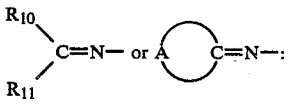

wherein:

$R_{10}$ is alkyl, alkylthio, alkoxy, alkanoyl or alkoxycarbonyl, all of which may be unsubstituted or aliphatically substituted in any combination with one or more cyano, nitro, alkylthio, alkylsulfinyl, alkysulfonyl, alkoxy or $R_{12}R_{13}$—NCO— groups; or $R_{10}$ is phenyl, $R_{12}R_{13}$NCO— or $R_{12}$CON($R_{13}$)—;

wherein:

$R_{12}$ and $R_{13}$ are independently hydrogen, alkyl or alkoxy;

$R_{11}$ is hydrogen, alkyl, alkylthio or cyano;

A is a four- or five-member divalent aliphatic chain which includes one or two divalent oxygen, sulfur, sulfinyl or sulfonyl groups and which may include not more than one divalent amino, alkylamino or carbonyl groups, in any combination; and $R_8$ and $R_9$ are independently alkyl containing from one to four carbon atoms.

11. A method of protecting plants from plant parasitic nematodes comprising applying to the locus of the nematode infestation a plant protectant amount of a compound having the formula:

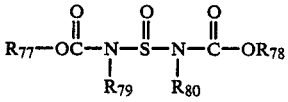

wherein:

$R_{79}$ and $R_{80}$ are independently a hydrocarbyl group containing from 1 to 12 carbon atoms; $R_{77}$ is a hydrocarbyl group containing from 1 to 20 carbon atoms, a 5 to 6 membered heterocyclic ring containing O or S atoms, or a >C=N— radical; and $R_{78}$ can be other than $R_{77}$ and is a hydrocarbyl group containing from 1 to 20 carbon atoms or a 5 to 6 membered heterocyclic ring containing O or S atoms; or $R_{78}$ can be the same as $R_{77}$.

12. A method of protecting plants from plant parasitic nematodes comprising applying to the locus of the nematode infestation a plant protectant amount of a compound having the formula:

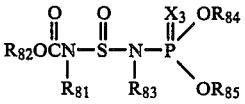

wherein:

$R_{81}$ is alkyl of 1 to 4 carbon atoms; $R_{82}$ is a heterocyclic group of the formula:

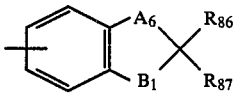

in which $R_{86}$ and $R_{87}$ are hydrogen or alkyl of 1 to 4 carbon atoms, $A_6$ and $B_1$ are each oxygen, or one of $A_6$ and $B_1$ is methylene and the other is oxygen or sulfur; or $R_{82}$ is an imino group of the formula

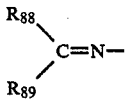

wherein $R_{88}$ is hydrogen, a dialkylaminocarbonyl or alkyl of 1 to 4 carbon atoms and $R_{89}$ is alkylthio or alkylthioalkyl and wherein the alkyl groups are the same or different and have 1 to 4 carbon atoms;

$R_{83}$ is alkyl of 1 to 12 carbon atoms; or cycloalkyl of 3 to 6 carbon atoms;

$X_3$ is oxygen or sulfur; and $R_{84}$ and $R_{85}$ are the same or different and are alkyl of 1 to 6 carbon atoms; or together can constitute the carbons necessary to complete a 5 to 6 membered ring system which is either unsubstituted or substituted by 1 or 2 methyl groups.

13. A method of protecting plants from plant parasitic nematodes comprising applying to the locus of the nematode infestation a plant protectant amount of a compound having the formula:

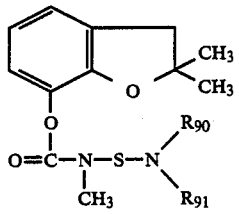

wherein $R_{90}$ and $R_{91}$ may be the same or different and are alkyl of 1 to 8 carbon atoms, cycloalkyl of 3 to 6 carbon atoms, or benzyl, or $R_{90}$ and $R_{91}$ taken together with the nitrogen may form a pyrollidine, piperidine, morpholine, piperazine, or hexahydroazepine heterocyclic ring which may have one or more substituents selected from alkyl, benzyl, phenyl, or alkoxy.

14. A method of protecting plants from plant parasitic nematodes comprising applying to the locus of the nematode infestation a plant protectant amount of a compound having the formula:

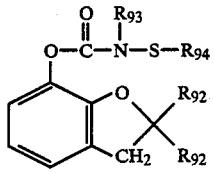

wherein:

$R_{92}$ and $R_{93}$ individually are hydrogen or alkyl of 1 to 4 carbon atoms, and $R_{94}$ is alkyl of 1 to 12 carbon atoms, alkenyl of 2 to 12 carbon atoms, monocyclic or bicyclic aryl of 6 to 10 carbon atoms, alkyl of 2 to 12 carbon atoms substituted with 1 to 5 flourine, chlorine or bromine atoms, alkenyl of 2 to 12 carbon atoms substituted with 1 to 5 flourine, chlorine or bromine atoms, or monocyclic or bicyclic aryl of 6 to 10 carbon atoms substituted with 1 to 5 flourine, chlorine or bromine atoms, or 1 to 2 nitro groups.

15. A method of protecting plants from plant parasitic nematodes comprising applying to the locus of the nematode infestation a plant protectant amount of a compound having the formula:

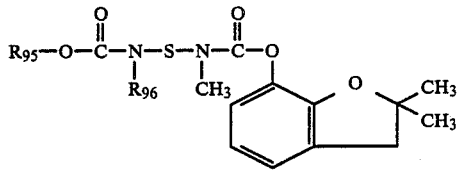

wherein: $R_{95}$ is $C_1$–$C_{10}$ alkyl, $C_1$–$C_2$ alkoxy-$C_1$–$C_2$ alkyl or cyclohexyl and $R_{96}$ is $C_1$–$C_4$ alkyl.

16. A method of protecting plants from plant parasitic nematodes comprising applying to the locus of the nematode infestation a plant protectant amount of a compound having a formula selected from the group consisting of:

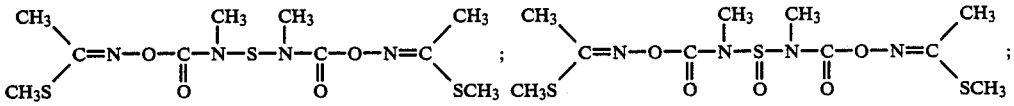

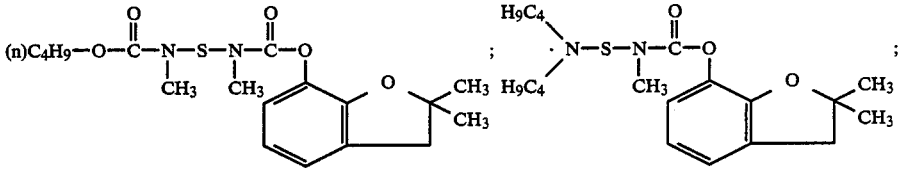

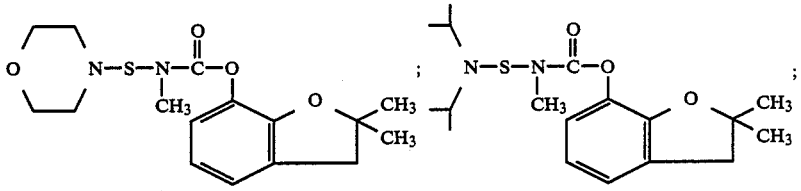

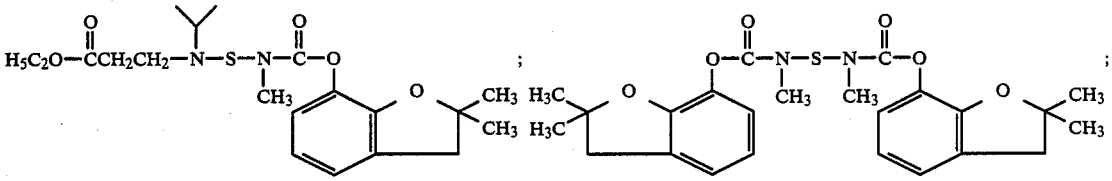

-continued

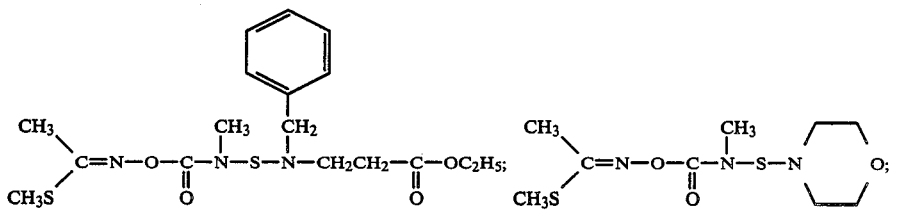

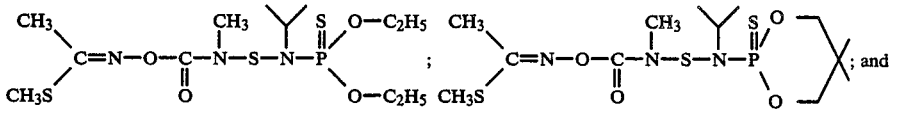

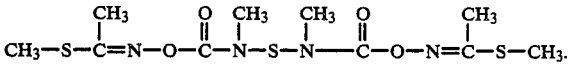

17. The method of claim 16 wherein the compound has the formula

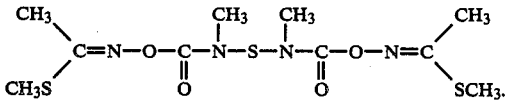

18. The method of claim 16 wherein the compound has the formula

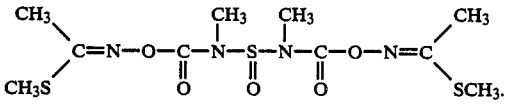

19. The method of claim 16 wherein the compound has the formula

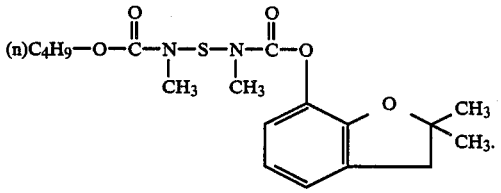

20. The method of claim 16 wherein the compound has the formula

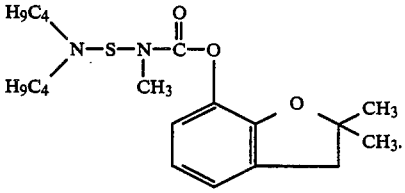

21. The method of claim 16 wherein the compound has the formula

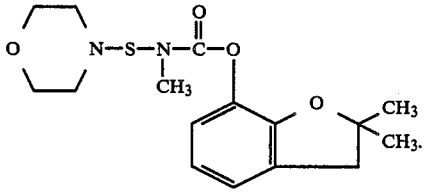

22. The method of claim 16 wherein the compound has the formula

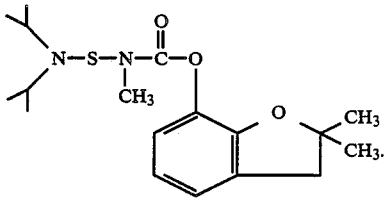

23. The method of claim 16 wherein the compound has the formula

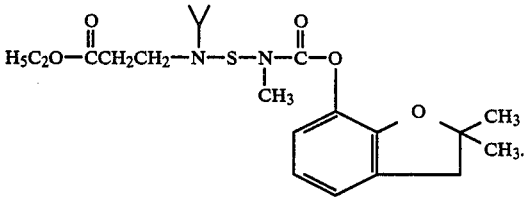

24. The method of claim 16 wherein the compound has the formula

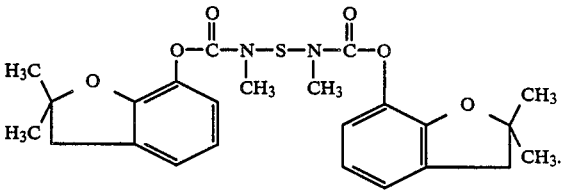

25. The method of claim 16 wherein the compound has the formula

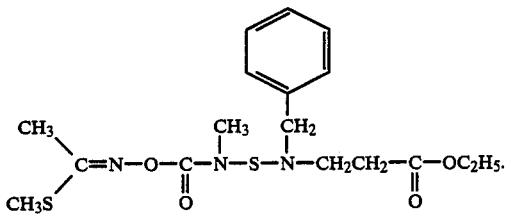

26. The method of claim 16 wherein the compound has the formula

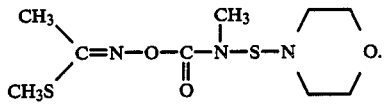

27. The method of claim 16 wherein the compound has the formula

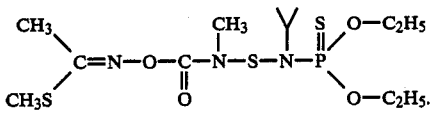

28. The method of claim 16 wherein the compound has the formula

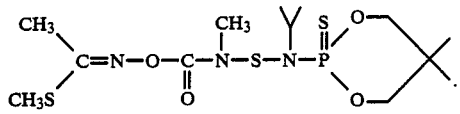

29. The method of claim 16 wherein the compound has the formula:

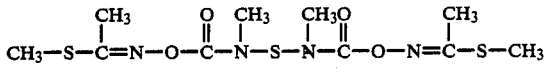

30. The method of claim 1 wherein the compound is applied to a plant seed.

31. The method of claim 1 wherein the compound is applied to a plant seed piece.

32. The method of claim 1 wherein the compound is applied to a plant root system.

33. The method of claim 1 wherein the compound is applied to a plant seed or seed piece at a concentration of from about 0.1 to about 10 percent by weight of the total weight of the seed or seed piece.

34. The method of claim 1 wherein the compound is applied to a plant root system or seed piece at a concentration of from about 0.001 to about 10 percent by weight of the total weight of the plant root system or seed piece.

35. The method of claim 1 in which the compound is used in combination with one or more biologically active materials.

* * * * *